US006976523B2

(12) United States Patent  (10) Patent No.: US 6,976,523 B2
Huang                     (45) Date of Patent: *Dec. 20, 2005

(54) COLLAPSIBLE AUTO SHADE

(76) Inventor: Sunny E. L. Huang, P.O. Box 1411, Burbank, CA (US) 91510

( * ) Notice: Subject to any disclaimer, the term of this patent is extended or adjusted under 35 U.S.C. 154(b) by 14 days.

This patent is subject to a terminal disclaimer.

(21) Appl. No.: 10/448,621

(22) Filed: Jun. 2, 2003

(65) Prior Publication Data
US 2003/0196769 A1  Oct. 23, 2003

Related U.S. Application Data

(63) Continuation-in-part of application No. 10/116,946, filed on Apr. 8, 2002, now Pat. No. 6,691,762, which is a continuation-in-part of application No. 09/766,557, filed on Jan. 19, 2001, now Pat. No. 6,561,257, which is a continuation of application No. 09/417,277, filed on Oct. 13, 1999, now Pat. No. 6,192,967.

(60) Provisional application No. 60/104,703, filed on Oct. 19, 1998.

(51) Int. Cl.$^7$ ................................................. B60J 1/20
(52) U.S. Cl. ........................... 160/370.23; 160/84.01; 160/368.1; 296/97.7
(58) Field of Search ................. 160/370.21, 370.22, 160/370.23, 368.1, 390, 84.01, 84.07; 296/97.7, 296/97.8

(56) References Cited

U.S. PATENT DOCUMENTS

| 1,808,652 A | 6/1931 | Gump |
| 1,927,137 A | 9/1933 | Soukup |
| 3,373,792 A | 3/1968 | Lessard |
| 4,227,542 A | 10/1980 | Bonfilio |
| 4,332,414 A | 6/1982 | Surtin |
| 4,606,572 A | 8/1986 | Maguire |
| 4,671,334 A * | 6/1987 | Yadegar et al. .......... 160/84.04 |
| 4,681,149 A | 7/1987 | Tung-Chow |
| 4,699,195 A | 10/1987 | Lester |
| D301,449 S | 6/1989 | Silva |
| 4,861,090 A | 8/1989 | Gavrieli |
| 4,934,584 A * | 6/1990 | Wyant ....................... 229/67.1 |
| 5,010,939 A | 4/1991 | King |
| 5,139,070 A | 8/1992 | Kidd |
| 5,183,092 A | 2/1993 | Jelic |
| 5,207,257 A | 5/1993 | Rupel |
| 5,222,261 A | 6/1993 | Tooze et al. |
| 5,356,191 A * | 10/1994 | Sheehan ..................... 296/95.1 |
| 5,562,142 A * | 10/1996 | Ziel et al. .............. 160/370.21 |
| 5,598,883 A | 2/1997 | Platsis |
| 5,632,318 A * | 5/1997 | Wang .................... 160/370.21 |
| 5,657,810 A | 8/1997 | Levy et al. |
| 5,660,220 A | 8/1997 | Ruan |

(Continued)

FOREIGN PATENT DOCUMENTS

| FR | 1256866 | 2/1961 |
| IT | 689866 | 4/1965 |
| JP | 294095 | * 4/2000 |

Primary Examiner—Bruce A. Lev
(74) Attorney, Agent, or Firm—Paul M. Denk

(57) ABSTRACT

A foldable automobile shade for use in an automobile prevents sunlight from entering the automobile. The shade comprises a storage accessory having at least one a pocket or chamber, at least one mounting strap used to mount said storage accessory to a visor of said car; a pleated screen operatively connected to the storage accessory near a bottom of the storage accessory and a closure which maintains said screen in its folded position.

15 Claims, 16 Drawing Sheets

U.S. PATENT DOCUMENTS

| | | |
|---|---|---|
| 5,762,124 A * | 6/1998 | Tseytlin et al. ........ 160/370.23 |
| 5,765,619 A | 6/1998 | Arnold |
| 5,778,955 A | 7/1998 | Chen |
| 5,967,161 A | 10/1999 | Neal |
| 5,979,967 A * | 11/1999 | Poulson ..................... 296/97.9 |
| 6,192,967 B1 | 2/2001 | Huang |
| 6,283,622 B1 * | 9/2001 | Chupp et al. ................ 362/492 |
| 6,371,546 B1 * | 4/2002 | Jefferson ................... 296/97.8 |
| 6,648,396 B2 * | 11/2003 | Monahan et al. .......... 296/97.7 |
| 6,691,762 B2 * | 2/2004 | Huang ................... 160/370.23 |
| 2002/0108726 A1 | 8/2002 | Huang |
| 2004/0035738 A1 * | 2/2004 | Julius ......................... 206/494 |

* cited by examiner

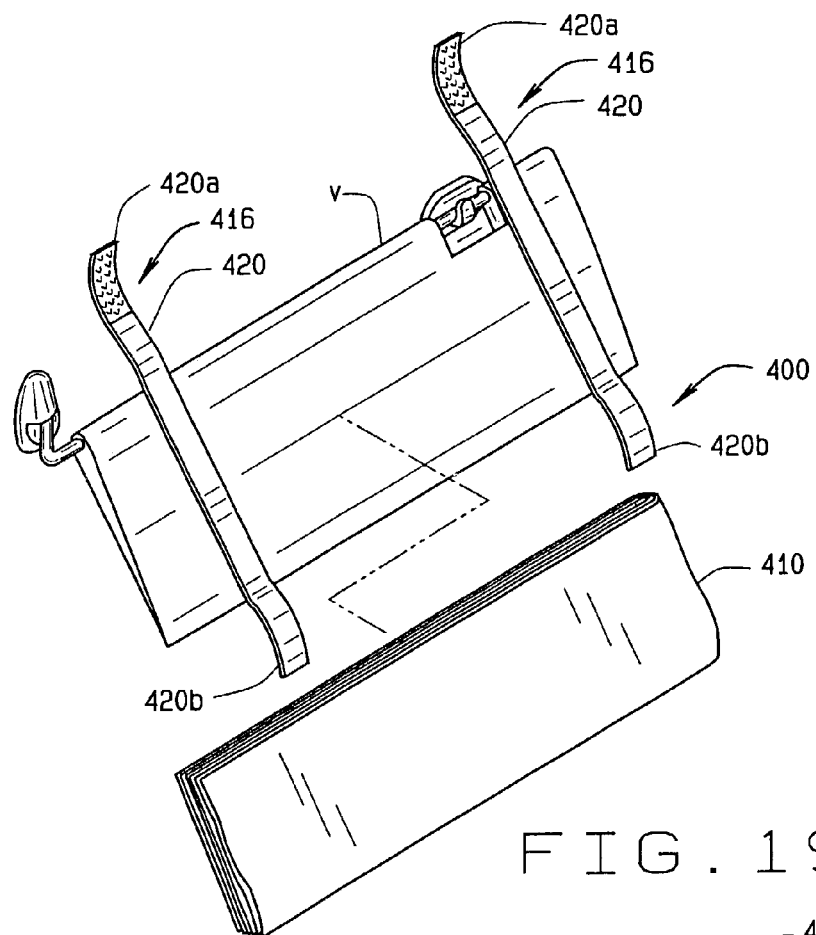
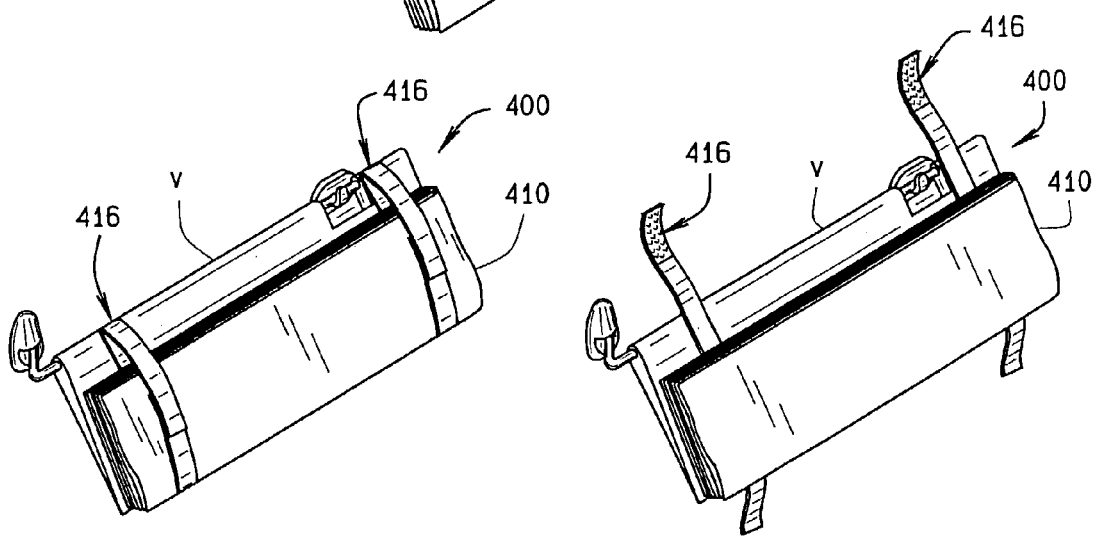
FIG. 19
FIG. 20  FIG. 21

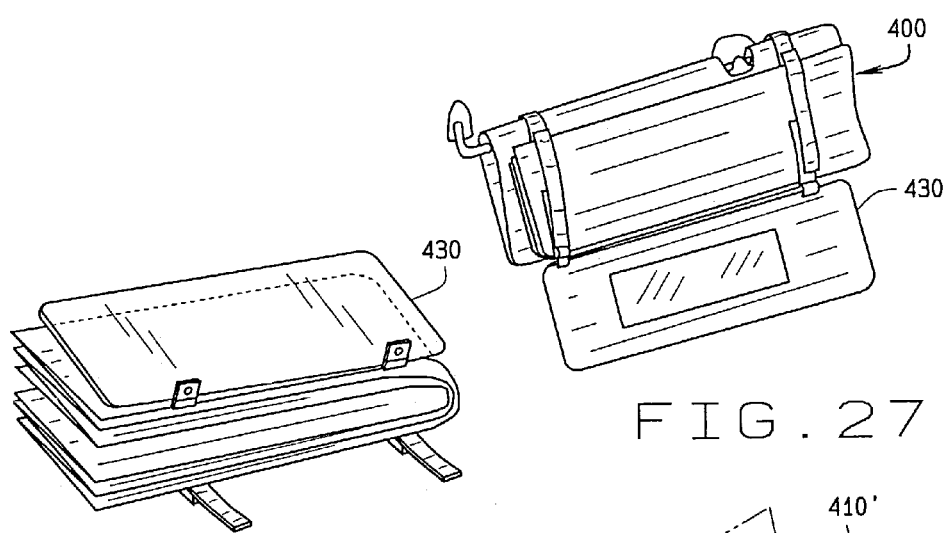
FIG. 27
FIG. 28
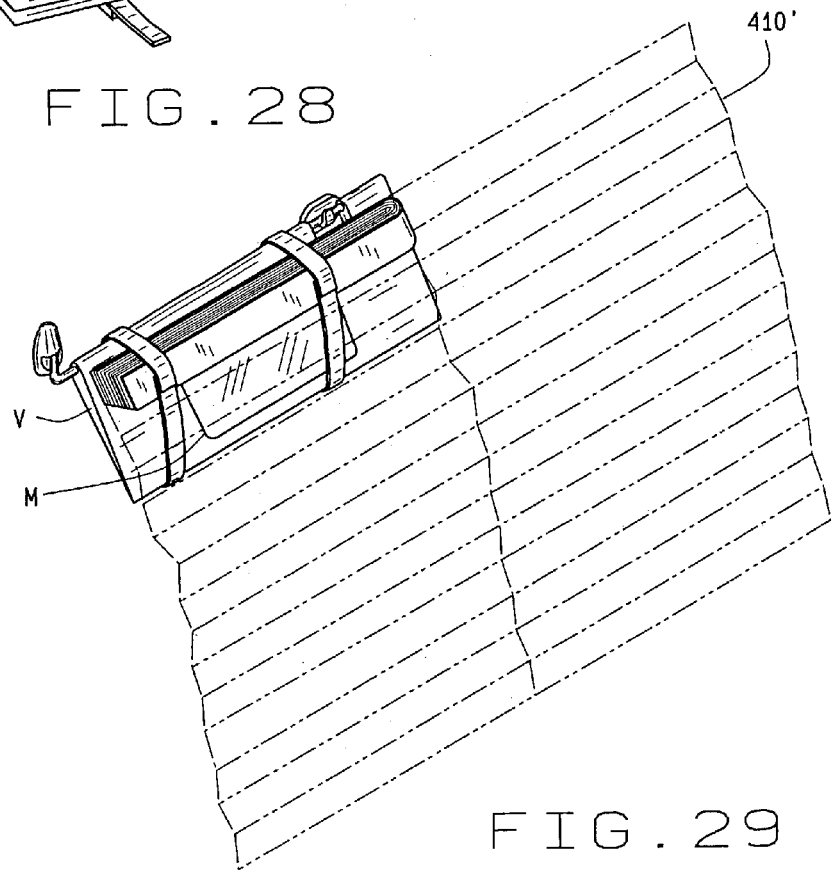
FIG. 29

COLLAPSIBLE AUTO SHADE

CROSS-REFERENCE TO RELATED APPLICATIONS

This application is a continuation-in-part of application Ser. No. 10/116,946 filed Apr. 8, 2002 now U.S. Pat. No. 6,691,762, which is a continuation-in-part of application Ser. No. 09/766,557 filed Jan. 19, 2001 now U.S. Pat. No. 6,561,257, which is continuation of application Ser. No. 09/417,277, filed Oct. 13, 1999, now U.S. Pat. No. 6,192,967, which, in turn claimed benefit to U.S. Provisional Application No. 60/104,703, filed Oct. 19, 1998, all of which are incorporated herein by reference.

STATEMENT REGARDING FEDERALLY SPONSORED RESEARCH OR DEVELOPMENT

Not Applicable.

BACKGROUND OF THE INVENTION

This invention relates to means for protecting the interior of an automobile, through the application of a shade generally to the interior of an automobile window, for the purpose of preventing the entrance of damaging sun rays and the generation of damaging heat.

Numerous styles of auto screens have long been available in the art. For example, my prior U.S. Pat. No. 5,035,460, upon an automobile window protector, and which is incorporated herein by reference, shows the fabrication of such a sheet, made of flexible material, and which could be applied to both the interior and exterior of the window of an automobile. In addition, my prior U.S. Pat. No. 5,024,262, and which issued as Re-examination certificate No. B1 5,024,262, and which is incorporated herein by reference, shows a compactly foldable automobile sunshade, which provided for inherent resiliency, at least around its perimeter loop, to hold the shade in its opened configuration, and to provide protection at the vicinity of the automobile window, but which could likewise be reduced in its size through folding of its frame into a more compact arrangement for storage.

The patent to Soukup, No. 1,927,137, shows an adjustable glare shield, for use within a motor vehicle. The patent to Lessard, U.S. Pat. No. 3,373,792, discloses an automobile rain visor. The patent to Surtin, U.S. Pat. No. 4,332,414, shows an automobile window shade device, comprising a pair of duplicate fan-shaped protectors for mounting to an automobile window. The patent to Maguire, U.S. Pat. No. 4,606,572, shows a similar type of dual fan arrangement for providing a sunshade for an automobile. The patent to Tung-Chow, U.S. Pat. No. 4,681,149, discloses window blinds for a vehicle, incorporating suction cups for adherence to a supporting surface adjacent the automobile window. The patent to Gavrieli, U.S. Pat. No. 4,861,090, discloses a fan-type automobile window shade. The patent to Chen, U.S. Pat. No. 5,694,998, discloses an automobile sunshade, being adjustable, and which can be extended longitudinally to cover different sized automobile windows, during application. The patent to Platsis, U.S. Pat. No. 5,598,883, shows another vehicular sun shield, formed as a collapsible fan like member. This device also discloses the use of a plurality of pleats, formed into the configuration of the fan, for screening purposes, once extended. The patent Ruan, U.S. Pat. No. 5,660,220, discloses a pleated fan type sunshade for motor vehicles. The U.S. design Pat. No. Des. 301,449, to Silva, shows another type of automobile sunscreen formed of a pleated like member.

The United States patent to Cheny, U.S. Pat. No. 3,046,048, discloses what is a magnetically secured windshield cover, which overlies and remains contiguous with the exterior of the automobile windshield. The prior patent to Shelton, U.S. Pat. No. 2,843,421, shows an automobile windshield awning, for locating and extending forwardly of the automobile windshield, and to protect it against the elements. The patent Ealey, et al, U.S. Pat. No. 3,184,264, shows a related type of windshield protector. The patent to Shafia, U.S. Pat. No. 4,863,943, discloses an adjustable vehicle sunshade, for fitting externally over the windshield and driver and passenger side windows. The patent to Sing, U.S. Pat. No. 4,784,215, discloses a thermal insulating shade for application over a vehicle window or windshield.

The patent to Eubanks, U.S. Pat. No. 4,736,980, discloses another form of more permanent type of windshield shade. The patent to Sarver, U.S. Pat. No. 4,560,245, discloses a vehicular windshield curtain for inhibiting heating transfer. The patent to Marchman, U.S. Pat. No. 3,336,969, shows a vehicle windshield and rear window cover. The patent to Gump, U.S. Pat. No. 1,808,652, shows a safety device for the side window of an early vehicle. The patent to Tubman, U.S. Pat. No. 1,790,333 shows a rear glare guard for an early vehicle. The patent to Crane, U.S. Pat. No. 1,732,447, discloses a sun shield, formed as a curtain, for application to the interior of an automobile window. The patent to Mahoney, U.S. Pat. No. 4,818,007, discloses a vehicle screen/shade. The patent to Miller, U.S. Pat. No. 4,790,591, shows a removable protective vehicle windshield screen. The patent to Cline, U.S. Pat. No. 4,671,558, discloses a rollable sunshield for vehicles. The patent to Richards, U.S. Pat. No. 4,652,039, shows another form of windshield shade, this one apparently made out of some type of paperboard, and which is collapsible for folding into a smaller configuration. The patent to Bruhl, U.S. Pat. No. 2,596,836, shows a glare shield for use interiorly of an automobile window. The patent to Drozt, U.S. Pat. No. 2,598,770, shows a flexible window screen. The patent to Kocinski, U.S. Pat. No. 2,489,901, shows an ice shield for application to the exterior of an automobile windshield. The patent to Osborn, U.S. Pat. No. 2,599,066, shows a multi-panel device for application over the windshield, to provide it with coverage particularly against inclement weather. The patent to Pinkerton, U.S. Pat. No. 2,751,977, shows a one-man automobile cover, for covering the entire vehicle. The patent to Moszelt, U.S. Pat. No. 2,614,630, shows a windshield cover for application over the windshield, as noted. The patent to Ketchum, U.S. Pat. No. 2,979,129, shows a similar type of windshield cover. The patent to Naterman, U.S. Pat. No. 1,475,647, discloses an adjustable visor for vehicle windshields. The patent to Omerly, Jr., U.S. Pat. No. 2,065,242, shows another form of exterior windshield protector. Finally, the patent to Gregg, U.S. Pat. No. 4,763,947, shows a sunscreen for motor vehicle, and which is apparently made of some form of paperboard, and is foldable into a more compact structure for storage.

BRIEF SUMMARY OF THE INVENTION

In accordance with the invention, I have developed collapsible of foldable automobile shades for use in an automobile to prevent sunlight from entering the automobile. The shade comprises a storage accessory having a pocket or a chamber, a mounting strap connected to said storage accessory and which is sized and configured to enable said storage accessory to be mounted to a visor of an automobile; a pleated screen operatively connected to said storage accessory near a bottom of said storage accessory; and a closure. A zipper can be provided to close the pocket or compartment. The storage accessory can be provided with a mirror. The pleated screen has a plurality of parallel pleats and is selectively movable between an unfolded position in which said screen can cover at least a portion of a vehicle window and a folded and stored position. When the screen is in its folded and stored position, the screen fits within the perimeter of the visor.

The screen is connected to the storage accessory by a web of flexible material which define a living hinge. The web can extend the width of said storage accessory; or define at least one strap (and preferably two straps) which extend between the storage accessory and the screen. The straps preferably has a width substantially less than the width of the storage accessory.

In one embodiment, the screen, when in its folded and stored position, is wrapped about said storage compartment. In this instance, the closure comprises a pair of spaced apart closure straps extending from a top edge of said accessory. The closure straps have a length sized to extend around opposite ends of the folded screen. The closure straps including fasteners at the ends thereof to secure said screen in its storage position. Preferably, the closure straps are parallel to the mounting straps and the fastener includes a second fastener section on the mounting strap which interacts with the fastener on said closure strap to hold the screen in its folded and stored position.

In another embodiment, the screen is folded over itself to place said screen in its folded and stored position. In this embodiment, the closure can comprise at least one strap which extends from one of a top or bottom edge of the storage accessory, has a length sufficient to extend over the screen when folded, and which is adapted to be operatively connected to the other of the top and bottom edges of the storage accessory to maintain said screen in its folded and stored position. For example, the strap can extend from the top edge of the storage accessory and have a fastener which is matable with a fastener on the bottom edge of the storage accessory.

The closure can alternatively comprise a first flap and a second flap which have a combined length sufficient to extend around the screen when folded to its stored position and to overlap each other. The first and second flaps including mating fastening elements which interact to maintain the screen in its folded and stored position. In one variation, the first flap extends from a bottom of the storage accessory and the second flap is mounted to the mounting straps below the first flap. In another variation, the first and second flaps are integrally formed with said storage accessory and define an upper portion and a lower portion, respectively, of the storage accessory. In this variation, the storage accessory is formed similarly to a jewelry roll. The storage accessory can include a pocket formed on one or more of the midsection of the storage accessory, an inner surface of the storage accessory upper portion, and on an outer surface of the storage accessory upper portion. If the storage accessory is to be provided with a mirror, the mirror is fixed to the outer surface of the upper portion.

BRIEF DESCRIPTION OF THE SEVERAL VIEWS OF THE DRAWINGS

FIG. 19 is an exploded view of a visor-mounted shade;

FIG. 20 is a perspective view of the visor-mounted shade in a collapsed position and held in the collapsed position by a band;

FIG. 21 is a perspective view of the visor-mounted shade in a collapsed position with the band released to allow for unfolding of the shade;

FIG. 27 is a perspective view of a visor mounted shade including a secondary visor which can be flipped down when the screen is folded;

FIG. 28 is a perspective view of a shade similar to the shade of FIG. 27, but wherein the secondary opaque visor is replaced with a transparent tinted visor;

FIG. 29 is a perspective view of a visor mounted shade similar to the shade of FIG. 28, but wherein its pleats are smaller; the shade screen being shown unfolded in phantom;

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Figure 1:
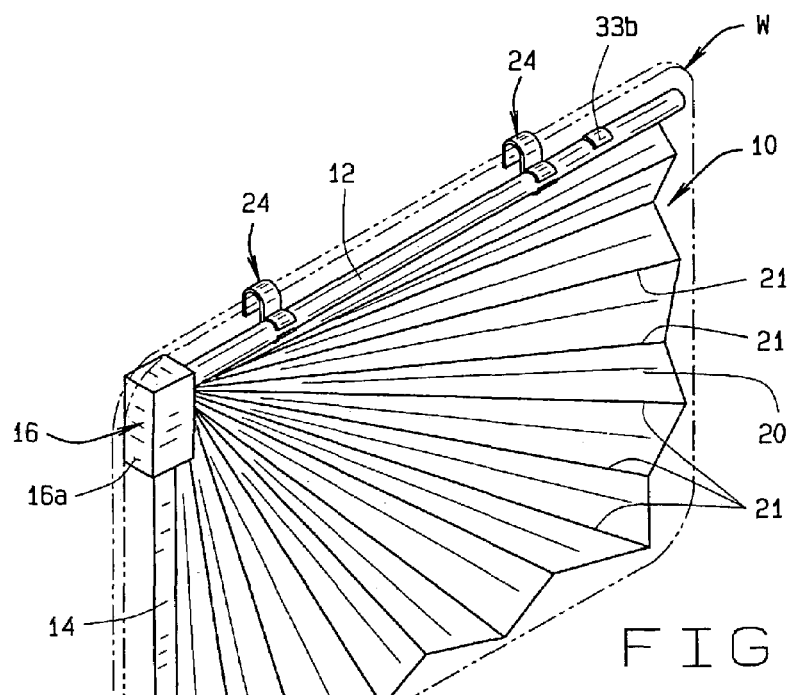
FIG. 1 is a perspective view of one embodiment of a vehicle window shade of the present invention when expanded and mounted on a car window.
Figure 2:
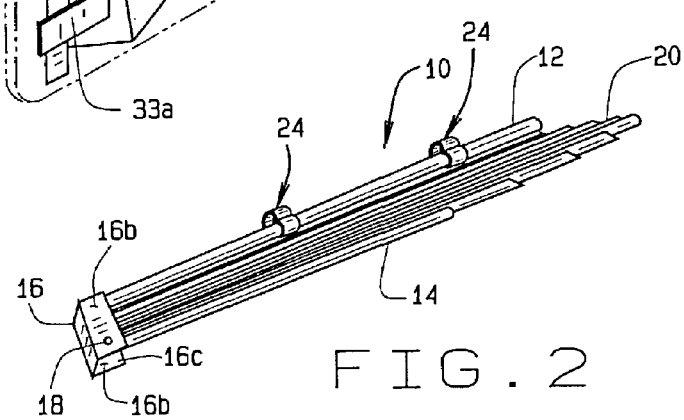
FIG. 2 is a perspective view of the window shade when collapsed.

A first illustrative embodiment of a vehicle window shade 10 is shown in FIG. 1 mounted on a window W. The shade 10 includes two frame members 12 and 14 which are connected to a base 16. The base 16 is generally rectangular in side elevation, and includes a bottom 16a and a pair of spaced apart side walls 16b to define a channel. At least one end of the channel is opened, as at 16c. The channel has a width slightly greater than the diameter of the frame members 12 and 14, such that the frame members can be received in the channel. The first frame member 12 is fixed to the base 16 at one end, and the second frame member 14 is pivotally connected to the base 16 at the opened end 16c of the base by a pin 18 which extends through the frame member 14 and base side walls 16b. The frame member 14 is pivotal between a closed position, in which it is generally parallel to the frame member 12 (as seen in FIG. 2), and an opened position, in which it is generally perpendicular to the frame member 12 (as seen in FIG. 1).

A pleated screen 20 is connected to the frame members 12 and 14 along adjacent edges of the screen. As seen, the screen 20, when expended, is generally rectangular in shape. The pleats 21 of the screen 20 allow for the screen 20 to be folded or compressed, as seen in FIG. 2, for storage of the shade 10. The pleats 21 are not parallel to each other. Rather, they radiate from a pivot point of the screen 20 within the base 16.

The shade 10 can be mounted to a side window a vehicle to block sunlight from coming in through the vehicle side windows, or to a visor in the vehicle to block sunlight from coming in through the vehicle's front window.

Mounting clips 24 (FIG. 3) are provided to mount the shade 10 to a vehicle's side window. The mounting clip 24 has a generally C-shaped body 26 which is sized and shaped to be snapped onto the shade frame member 12. A hook 28 extends from a back of the clip body 26 and faces rearwardly relative to the C-shaped body 26. The hook 28 is sized and shaped to fit over the top of the vehicle side window W, as seen in FIG. 1, such that the window can be substantially closed when the clip is on the window. As seen, preferably two clips 24 are provided with the window shade 10 so that the frame member 12 (and hence the shade 10) can be supported at two spaced apart locations. As can be appreciated, the clips 24 are simply applied by urging the C-shaped clip bodies 26 onto the frame member 12. The clip bodies will expand as they are applied to the frame member 12, and then snap into place once the clip is pressed about half-way over the member 12.

One or more clips 30 are provided can be mounted to the pivotal frame member 14 to hold the frame member 14 in its opened position (to maintain the shade screen 20 in the open or expanded position seen in FIG. 1). Without the clips 30, the shade 10 relies on the force of gravity and the weight of the frame member 14 to hold the shade 10 in the opened position.

Figures 3, 4A, 4B:
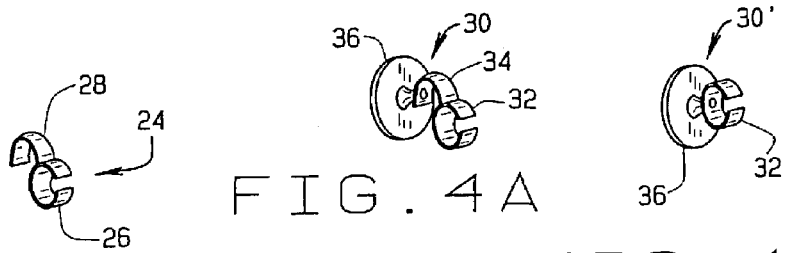
FIG. 3 is a perspective view of a clip for mounting the window shade to a side window of the vehicle.
FIGS. 4A and B are perspective views of clips having suction cups to hold the shade in the opened position or to mount the window shade to a window.

As seen in FIG. 4A, the clip 30 is substantially similar to the mounting clip 24. The clip 30 includes a generally C-shaped body 32 which is sized and shaped to be snapped onto the frame member 14. A hook 34 extends from the back of the body 32, and a suction cup 36 extends from the back of the hook 34. An alternative clip 30' is shown in FIG. 4B. The clip 30' includes the same body 32. However, the suction cup 36 is mounted directly to the back of the clip body 32; the clip 30' does not include a hook, and hence has a shorter distance from the surface of the suction cup to the front of the clip body. As seen, the suction cup 36 is spaced about 180° from the opening in the clip body 32 to be generally opposite or behind the opening in the clip body 32. As can be appreciated, the clips 30 and 30' can also be used to mount the shade to the window W.

In use, preferably at least two mounting clips 24 (or 30 or 30') are snapped onto the frame member 12. Additionally, at least one clip 30 (or 30') can be mounted to the frame member 14 (for example, near the end of the frame member remote from the base 16). The vehicle window is lowered sufficiently to allow the hooks 28 of the mounting clips 24 to be applied to the window, and the window is then raised. The clip hook 28 will be sandwiched between the top of the window and the window frame, to secure the clips 24 in position on the vehicle's side window. The shade 10 is expanded, as seen in FIG. 1, and the suction cup 36 of the clip 30 (or 30') is applied to the window in a well known manner to hold the frame member 14 in a desired position. When not in use, the shade 10 can be left in place on the window; the shade can be collapsed to the position shown in FIG. 2, and the shade can be held closed, for example, using the suction cup 36 of the clip 30 (or 30'). Alternatively, the base member can be provided with a closure mechanism which will hold the frame member 14 in its closed position; or a strap, can be used to hold the screen 10 in its closed position. In the shade 10 of FIG. 1, one portion 33a of a hook-and-pile fastener is mounted to the frame member 14, and an opposing portion 33b is mounted to the frame member 12. The hook-and-pile fastener portion 33a can be engaged with the hook-and-pile fastener portion 33b to hold the shade in its closed position.

Figure 5:
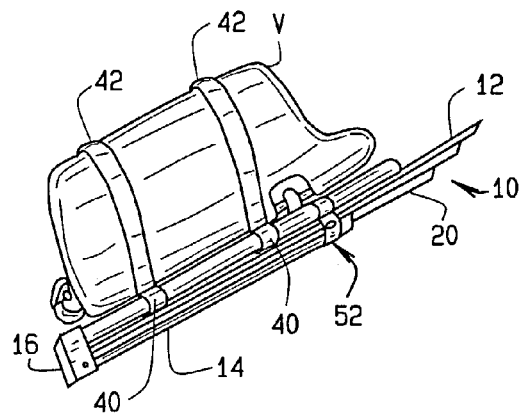
FIG. 5 is a perspective view of the shade in a collapsed position and mounted on a visor.
Figure 6A:
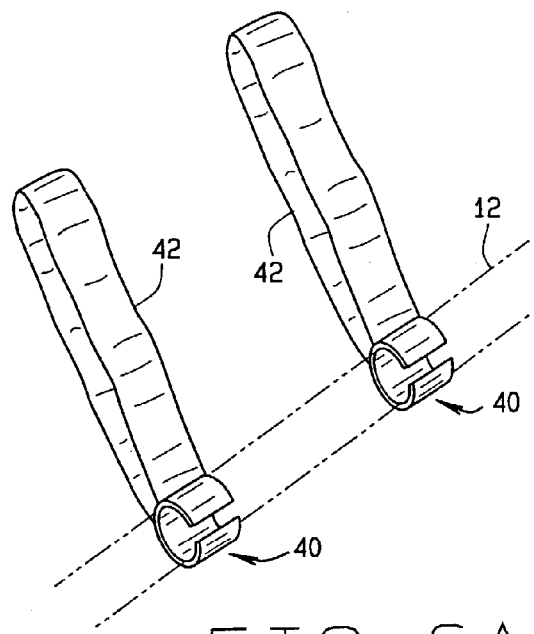
FIGS. 6A–C are perspective views of clips for mounting the shade to the visor.

In FIG. 5, the shade 10 is shown mounted to a visor V, so that the shade can be used to block light coming in through the vehicle's windshield. The shade 10 can be secured to the visor V any conventional manner. A preferred method is to mount the shade 10 to the visor V using clips 40 which mount to the shade frame member 12 and which include an elastic strap 42 sized to stretchingly fit around a standard visor. The strap 42, rather than being elastic, could have two ends which are connected together using snaps, buttons, Velcro hook-and-pile fasteners, or the like. The clip 40 is generally C-shaped and is snappingly applied to the frame member 12. The strap 42 is preferably spaced about 90° from the opening in the clip 40, as seen in FIG. 6A, such that when the clip 40 is applied to the visor V, the clip opening will face outwardly from the visor.

Figure 6B:
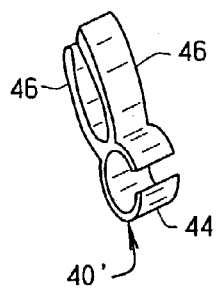

An alternative clip 40' is shown in FIG. 6B. The clip 40' includes a generally C-shaped clip body 44 which is sized and shaped to be snappingly applied to the frame member 12. A pair of flexible legs 46 extend from the clip body 44. The legs 46 are sized, shaped, and positioned on the clip body 44 such that one leg extends across one (i.e., top) surface of the visor V and the other leg extends across the opposite (i.e., bottom) surface of the visor V. The two legs grip the visor to hold the clip 40', and hence the shade 10, to the visor V. The legs 46 are preferably spaced about 90° from the opening in the clip body 44, such that when the clip 40' is applied to the visor V, the clip opening will face outwardly from the visor.

Figure 6C:
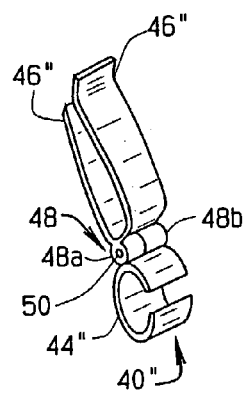

A third version of the clip is shown in FIG. 6C. The clip 40" is similar to the clip 40'. It includes a generally C-shaped body 44" with a pair of legs 46" extending from the body, preferably about 90° from the opening of the C-shaped body 44". However, the legs 46" are hingedly connected to the body 44" by a hinge 48, such that the legs 46" can pivot together relative to the body 44". The legs are connected together by one-half 48a of the hinge, and a second half 48b of the hinge extends from the clip body 44". A pin, shaft, or the like 50 extends through the two hinge halves to pivotally mount the legs 46" to the clip body 44". The clip 40" operates and is used to mount the shade 10 to the visor V in the same way as the clip 40' mounts the shade to the visor. However, the hinge 48 gives greater flexibility in the positioning of the shade 10 relative to the visor V.

Figure 7:
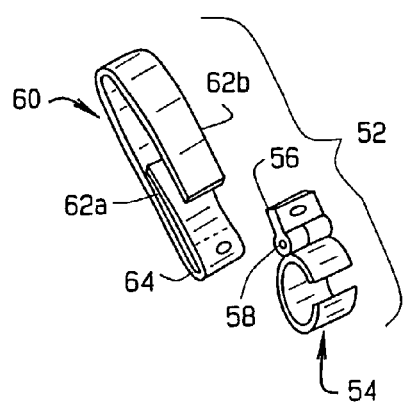
FIG. 7 is an exploded perspective view of a locking band assembly used to hold the shade in the collapsed position.
Figure 8:
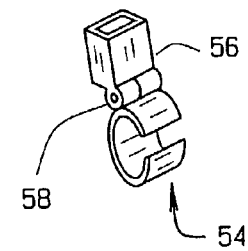
FIG. 8 is an enlarged view of a clip of the locking band assembly to mount the locking band to a frame member of the shade.

It is desirable to leave the shade in place on the visor V when not in use. Obviously, it is important to maintain the shade 10 in its closed position (such as seen in FIG. 2 and 5) when the shade 10 is not in use. A belt or strap assembly 52 (FIGS. 5 and 7–8) is provided to maintain the shade closed. The strap assembly 52 includes a C-shaped clip body 54 which is sized and shaped to be snappingly applied to the frame member 14. A hollow leg 56 extends from the clip body 54. The leg 56 is preferably positioned about 90° from the opening of the clip body 54 and is preferably connected to the clip body 54 via a hinge 58. The hinge 58 is substantially identical to the hinge 48 of the visor mounting clip 40" (FIG. 6C).

A strap 60 is mounted in the leg 56. The strap 60 has two free ends 62a,b. The strap is folded at a point close to the end 62a, and stitched to itself to create a tail 64 which is sized to fit in the hollow leg 56, and is secured in the leg 56, for example using glue, or by welding, or by any other conventional means. The ends 62a,b of the strap 60 are provided with fastening means, such that the two ends can be connected together to form a closed loop. Such fastening means can include Velcro-type hook-and-pile fasteners, snaps, buttons, etc. Alternatively, the strap ends can simply be tied together. With the strap assembly 52 applied to the frame member 14, one end of the strap 60 is flipped around a back side of the shade 10, such that the strap end comes over the frame member 12. The two ends of the strap 60 can then be connected together, as seen in FIG. 5, to hold the shade 10 in the closed position. Although shown applied to the frame member 14, it will be apparent that the strap assembly could also be applied to the frame member 12, and then the strap would wrap around the frame member 14. It will also be appreciated that the strap assembly 52 can be used in conjunction with the side window mounting clips 24 to hold the shade 10 in a closed position when the shade is mounted to a side window.

As noted above in conjunction with FIG. 1, a hook-and-pile fastener strip can also be used to hold the shade closed.

Figure 9:
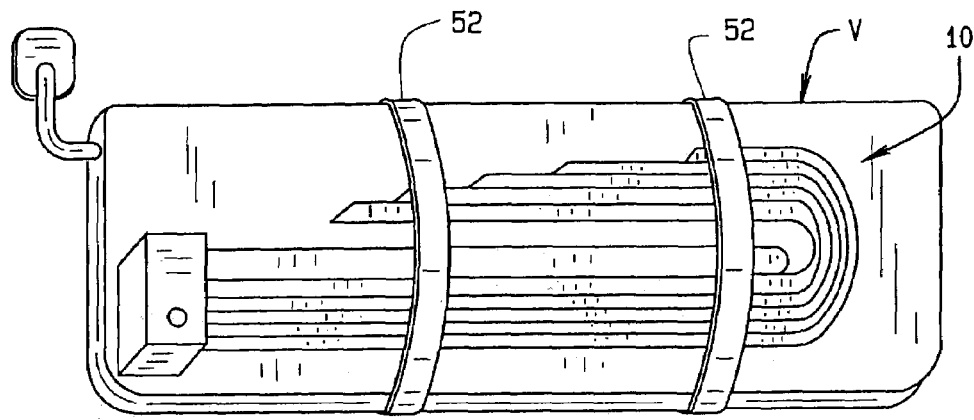
FIG. 9 is a perspective view of a second window shade shown in a collapsed position and mounted to a visor.

FIG. 9 shows the shade 10 (of FIG. 1) held to a visor V in a closed position by a pair of straps 52. The straps 52 can be elastic straps, or can have free ends (not shown) which connect together using any conventional connecting means (such as Velcro, snaps, buttons, etc) to secure the shade 10 to the visor V. As can be seen, the shade 10 is folded over so that it will not extend beyond the perimeter of the visor V. To allow for the shade 10 to fit within the perimeter of the visor V, its frame members 12 and 14 each have a length shorter than the length of the visor. Additionally, the frame member 14 does not extend the full height of the screen.

Figure 10A:
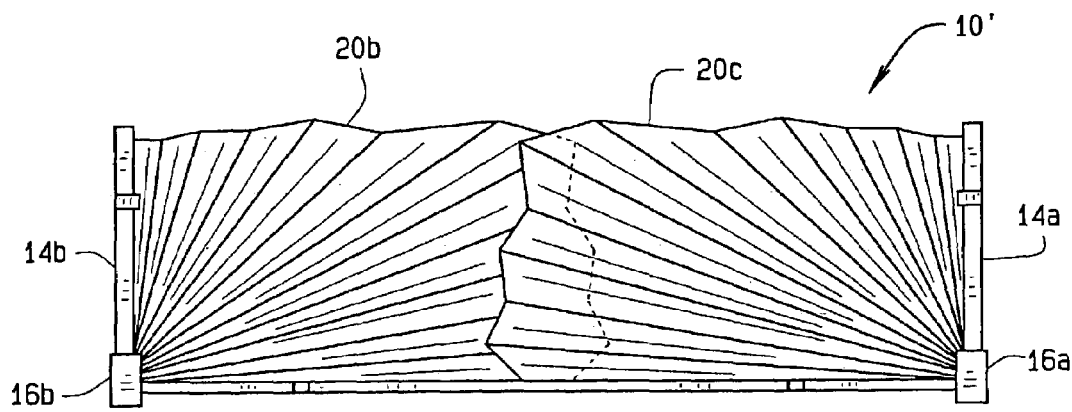
FIGS. 10A and 10B are views of a window shade having two screens sized to overlap each other when unfolded to cover a large window, i.e., a rear window, of a vehicle.
Figure 10B:
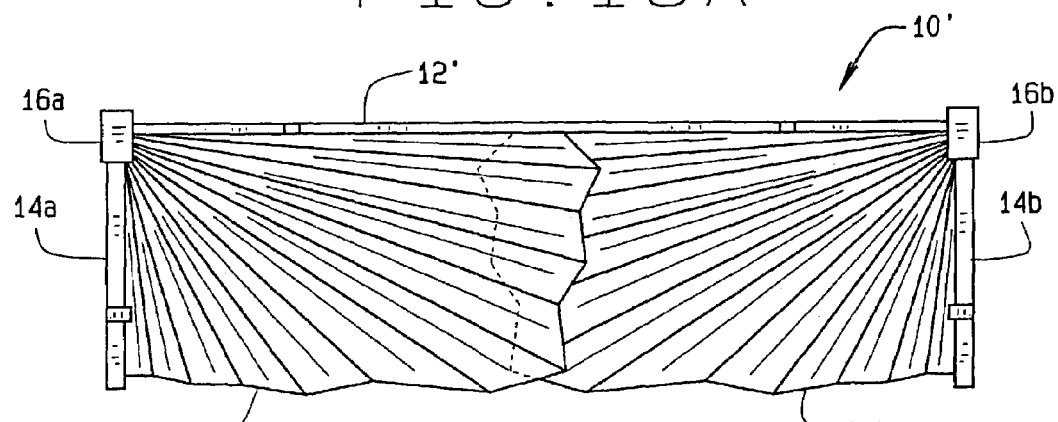

A double shade 10' is shown in FIGS. 10A and 10B, the shade 10' is similar to the shade 10, however, rather than including a single screen, the shade includes two screens 20a,b which overlap each other when expanded. The screens 20a,b each include their own frame member 14a,b and their own bases 16a,b. However, they have a common frame member 12' which extends between the bases 16a,b. The shade 10' can be mounted in a car window, such as a front windshield or back window, such that the common frame member 12' extends along the top of the window (FIG. 10B) or along the bottom of the window (FIG. 10A). In either case, when the two screens 20a,b are expanded, they overlap each other approximately along the middle of the frame member 12'. Further, the screens 20a,b are shaped such that there is substantially no gap between the two shades where the overlap between the frame member 12' and the opposite edge of the screens 20a,b. Preferably, the screens 20a,b are generally rectangular when expanded. However, the screens 20a,b can have different shapes as necessary to conform to the shape of the window to which they are applied.

Figure 11:
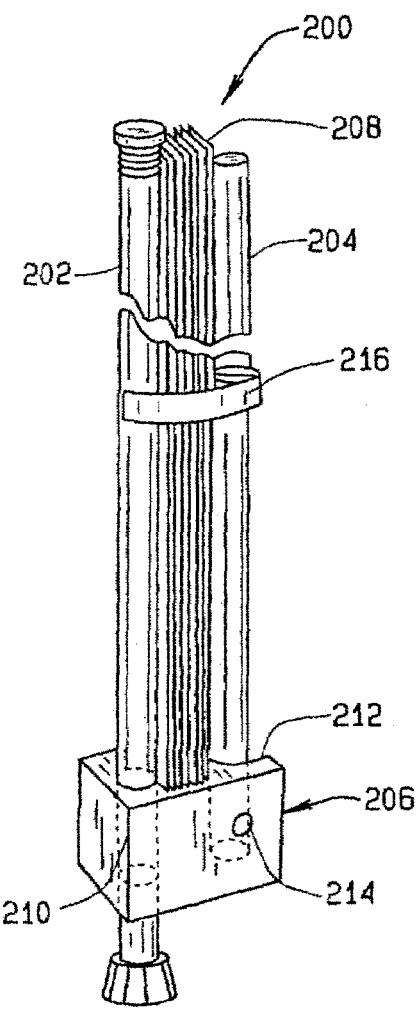
FIG. 11 is a perspective view of another embodiment of the window shade which is mountable to a door lock pin on the vehicle door.
Figure 12:
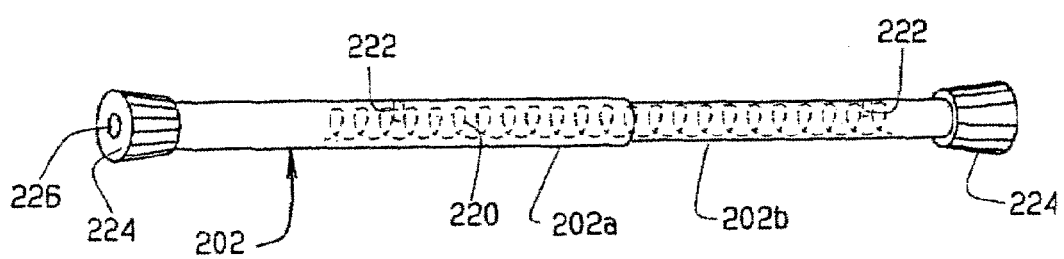
FIG. 12 is a perspective view of an expandable, spring-biased mounting member used to secure the shade in a vehicle window frame.

A second alternative embodiment of the shade is shown in FIGS. 11 and 12. The shade 200 includes a pair of frame members 202 and 204, a base 206 from which the frame members extend, and a pleated screen 208 which is connected to the frame members 202 and 204 along adjacent sides of the screen. The screen 208 can be cut, such that it is rectangular, arcuate, or any other desired shape when expanded. The base 206, as seen, is generally rectangular, and includes a bore 210 near one end of the base through which the frame member 202 extends. Hence, the frame member 202 is fixed relative to the base 206. A channel 212 is formed in an end of the base opposite from the end where bore 210 is positioned. The channel 212 is sized and shaped to receive the frame member 204, and the frame member 204 is pivotally retained in the channel 212 by a pin 214 which extends through the frame member 204 and the walls of the channel 212. The size and shape of the channel 212 allows for the channel to snappingly engage or grasp the frame member 204. Hence, the frame member 204 can be pivoted into, and out of, the channel 212, to move the shade between a closed position as seen in FIG. 11, and an open position in which the screen 208 is expanded. To maintain the shade 200 in its closed position, the shade 200 includes a strap 216 which is fixed to one of the frame members and sized to extend around the shade when the shade is collapsed. The strap 216 includes a fastener member at its free end which is matable with an opposing fastener member positioned on the strap 216. The relative positions of the fastener members allow for the members to be engaged with each other when the strap is wrapped around the shade to hold the shade closed. Alternatively, the opposing fastener member could be on the opposite frame member (i.e., the strap 216 can be connected to frame member 202 and the opposing fastener member could be connected to the frame member 204).

Rather than rely on clips to hold the shade in position adjacent a vehicle window, the shade 200 relies on a compression fit of the frame member 202 in the frame of the vehicle window. The frame member 202 is an expandable/contractible spring-biased member, which, as seen in FIG. 12, includes two hollow tubes 202a and 202b which telescope relative to one another. A coil spring 220 is received within the tubes 202a,b and extends from tube 202a into tube 202b. The tubes each include a pin 222 which extends from an inner surface of the tube and engages a coil of the spring 220. Hence, the spring 220 bears against the pins 222 to urge the ends of the tubes 202a,b apart. The tube 202 can be lengthened or shortened by rotating one of the tubes relative to the other. The frame member 202 is also provided with end caps 224 on opposite ends of the frame member.

To use the shade 200, the shade is positioned in a vehicle window frame with the base 206 at the bottom of the window, and the frame member 202 extending vertically along one of the sides of the window frame. The length of the extendable frame member 202 is adjusted to create a compression fit of the frame member 202 within the window frame. The shade can then be opened by releasing the strap 216, and lowering the pivotal frame member 204. Additionally, the bottom end cap of the frame member 202 can be provided with a hole 226 (FIG. 12), to allow for the frame member to be easily positioned in vehicles in which the door lock comprises a pin which extends up from the bottom of the window frame. The hole 226 is sized to fit over the door lock pin.

Figure 13A:
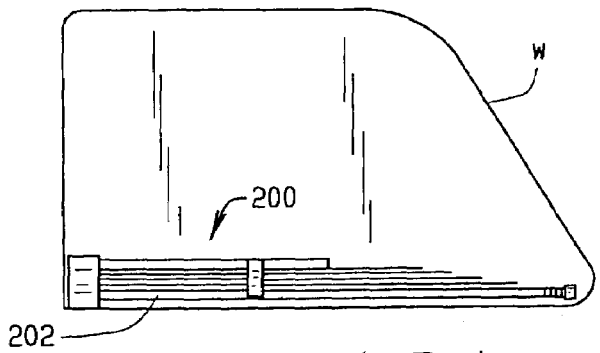
FIGS. 13A and 13B are side elevational views of window shades in a collapsed and expanded position, respectively, using the mounting member of FIG. 12 to hold the shade in a horizontal position in the window.
Figure 13B:
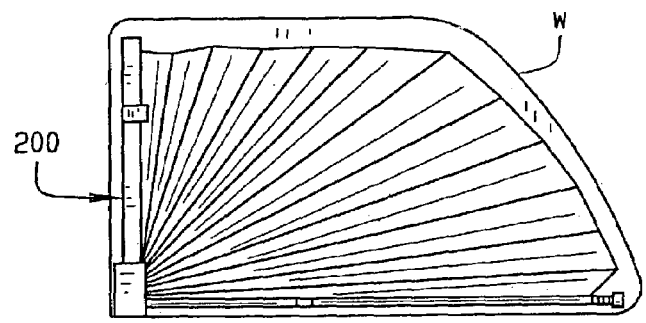
Figure 14A:
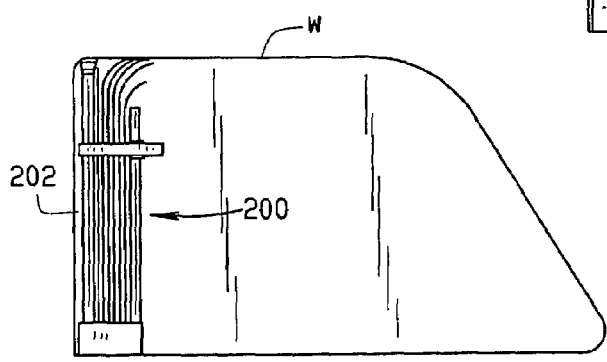
FIGS. 14A and 14B are side elevational views of window shades in a collapsed and expanded position, respectively, using the mounting member of FIG. 12 to hold the shade in a vertical position in the window.
Figure 14B:
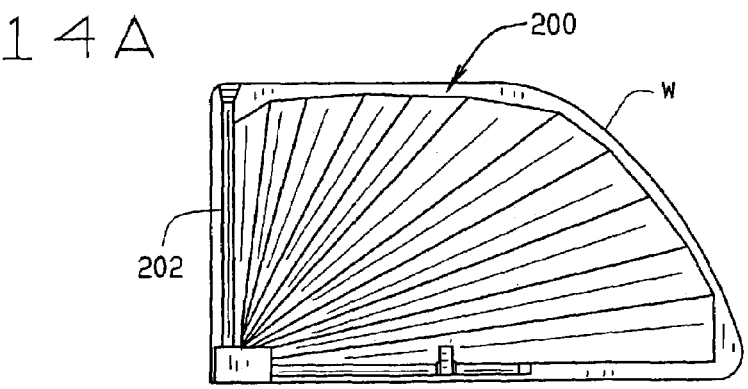

The shade 200 is shown in FIGS. 13A, B mounted in a window W with the frame member 202 extending along the bottom of the window. The shade is shown closed or collapsed in FIG. 13A and expanded in FIG. 13B. In FIGS. 14A,B the shade is shown mounted in a window W with the frame member 202 extending vertically along the side of the window. The shade is shown closed or collapsed in FIG. 14A and expanded in FIG. 14B.

Figure 15:
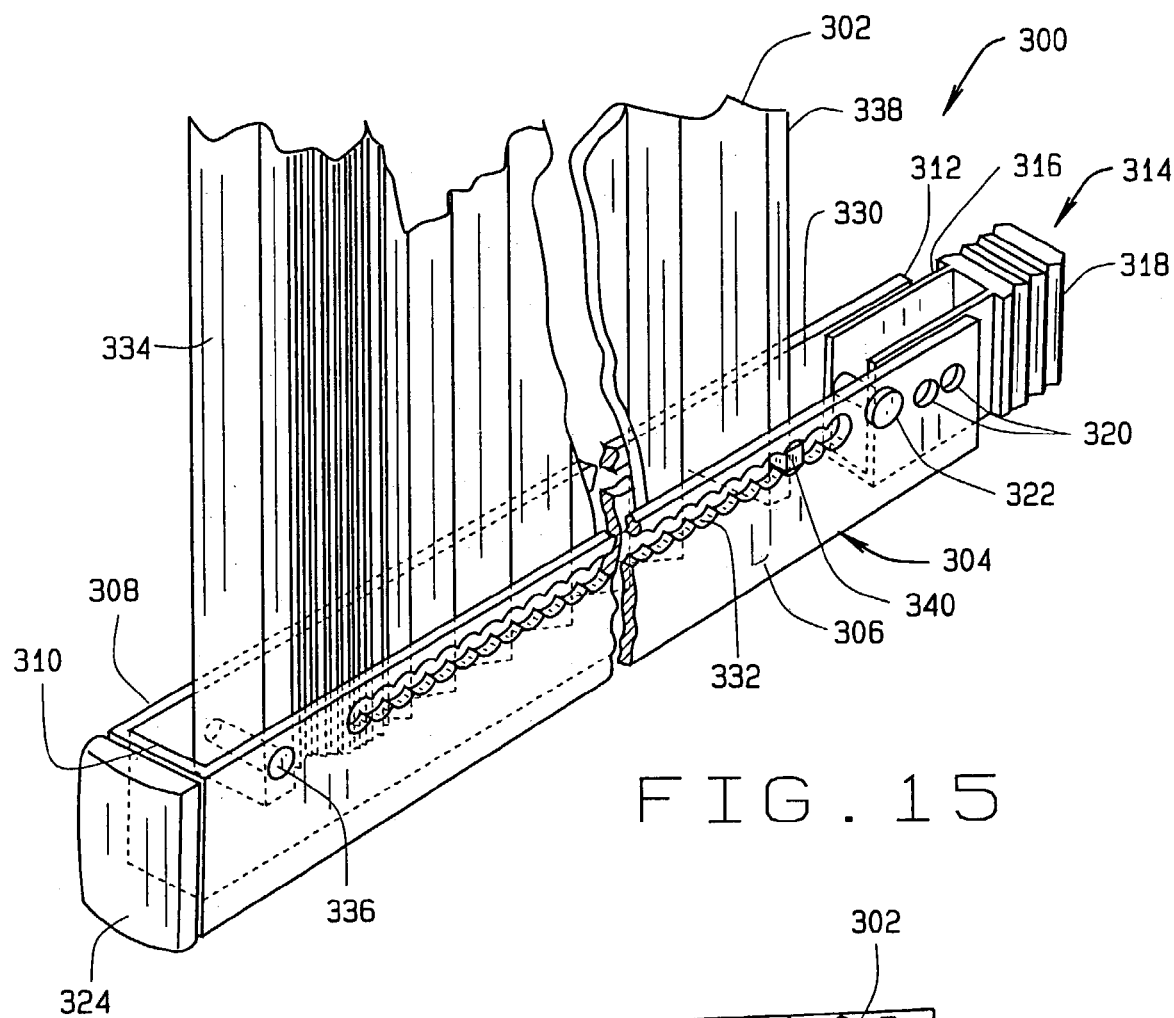
FIG. 15 is a perspective view of another embodiment of a window shade in which the shade is slidable along a channel or track.
Figure 16:
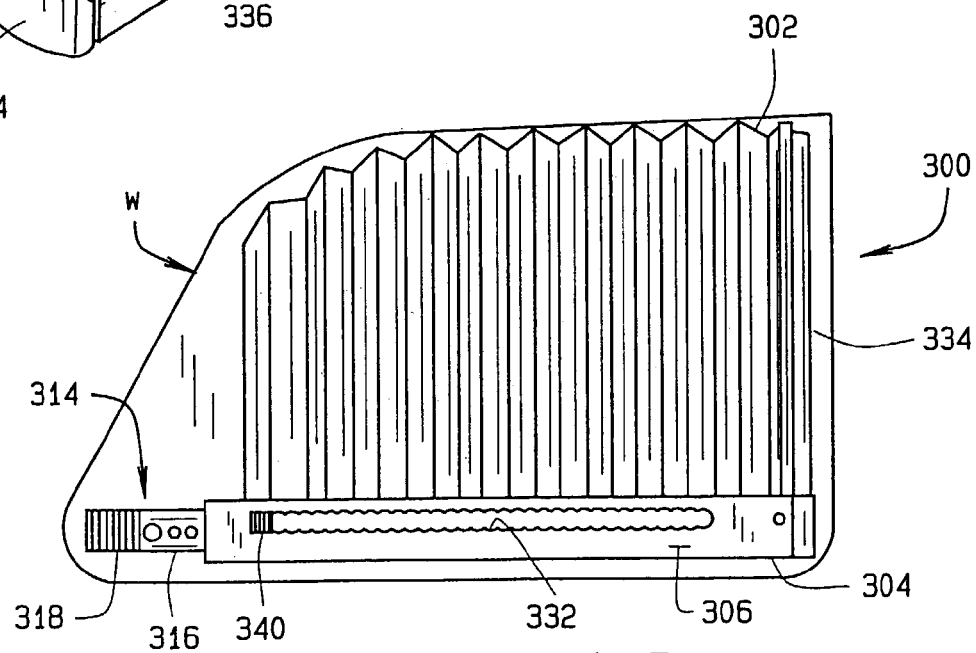
FIG. 16 is an elevational view of the shade of FIG. 15 in an expanded position.

A third embodiment of the shade is shown in FIGS. 15 and 16. The shade 300 comprises a fold-away pleated screen 302 mounted in a slide frame or track 304. Unlike the pleats of the screen 20 (FIG. 1), the pleats of the screen 302 are parallel to each other. The frame 304 includes a front wall 306, a back wall 308, and an end wall 310. The frame 304 is open at its end 312 opposite the end wall 310. A length adjuster 314 is mounted in the open end 312. The adjuster includes a neck 316, shown to be comprised of a pair of spaced apart legs, and a compressible head 318. The frame 314 includes aligned holes 320 in the front and back walls 306 and 308. A pin 322 extends through a desired set of aligned holes 320 and through holes in the neck 316 to fix the adjuster 314 in place in the frame 304. As can be appreciated, the length of the frame 304 can effectively be changed by altering the holes 320 through which the pin 322 extends to move the adjuster 314 axially relative to the frame 304. A pad 324 is mounted to the end wall 310. As can be appreciated, the frame 304 is mounted in a window of a vehicle by sizing the frame 304 using the adjuster 314 such that the adjuster head 318 will be compressed when the frame member is placed in position in the window, as seen in FIG. 16. The overall length of the frame 304 could alternatively be adjusted using a spring-biased member telescopingly received in the frame open end 312.

The frame 304 defines a channel 330 in which the screen 302 is mounted. Additionally, the frame front wall 306 includes an elongate slot 332. The edges of the slot 332 are not straight. Rather, the slot edges give the appearance of a plurality of intersected holes, to form a plurality of stops along the slot 332. The shade includes an arm 334 which is pivotally mounted in the frame channel 330 near the end wall 310. A pin 336, for example, can be used to pivotally mount the arm 334 in the frame channel 330. The screen 302 is connected along one edge to the arm 334. The opposite side of the screen 302 is connected to a second arm 338 which extends into the frame channel 330. A button 340 is operatively connected to the second arm 338. As can be appreciated, the arm 340 can be pulled away from the arm 334 to expand the screen 302. The button 340 engages the discrete spots in the slot 332 to maintain the screen 302 at a desired state of expansion. Conversely, to collapse the screen 302, the second arm 338 of the screen 302 is moved towards the arm 334 to collapse the screen along its pleats. The interaction of the button 340 with the slot 332 will serve to hold the screen 302 in its collapsed position.

As can be seen in FIG. 15, the base of the pivotal arm 334 is above the bottom of the channel 330. When the shade 300 is not in use. The screen 302 can be collapsed, and the arm 334 and the screen 302 can be pivoted downwardly into the channel 330. This forms a compact product which is easy to store.

Although the shade 300 is described to include an arm 338 to which the free end of the screen 302 is secured, the second arm 338 can be omitted and replaced either with a reinforced edge of the screen, or nothing at all. In this case, the button 340 will be operatively engaged with the free end of the screen to maintain the screen in its expanded position.

Figure 17:
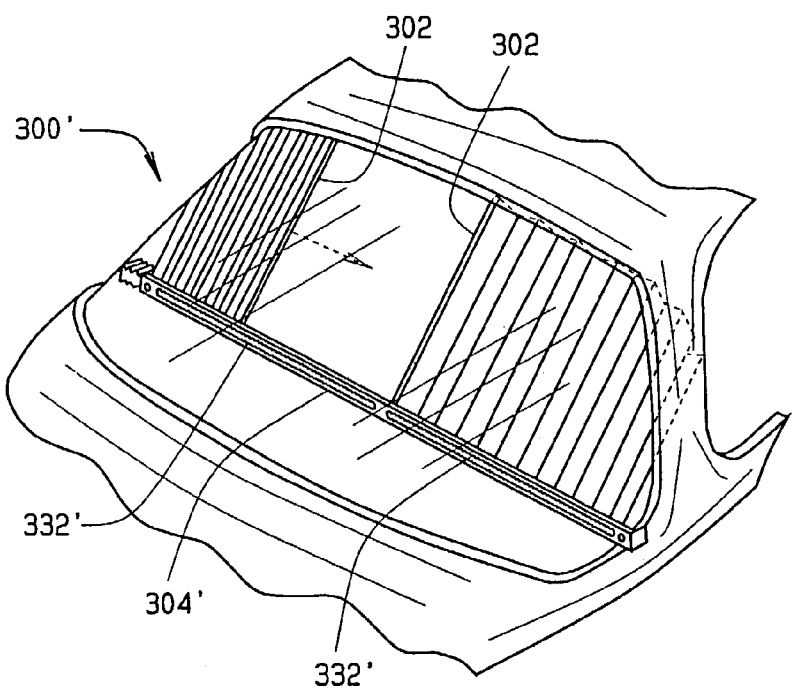
FIG. 17 is an elevational view showing a shade mounted in an automobile and which is similar to the shade of FIG. 15, but has two screens which are slidable along a common track.

A double shade 300' is shown in FIG. 17. The shade 300' includes an elongate frame 304' which receives two screens 302. The frame has a pair of side slots 332' which extend from opposite ends of the frame 304' towards the middle of the frame, and are spaced from each other at the middle of the frame. The shade 300' operates in the same manner as the shade 300. However, because it comprises two screens, the shade 300' can be used in conjunction with larger windows, such as the rear windows of cars, vans, or station wagons.

Figure 18:
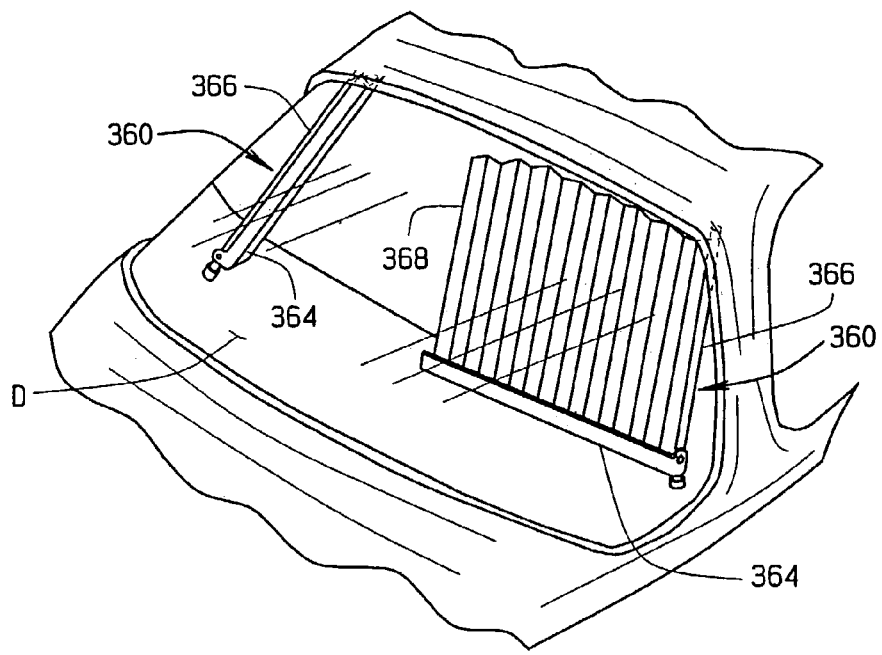
FIG. 18 is an elevational view showing two shades mounted in an automobile and which have screens mounted in separate tracks, one shade being collapsed, and the other being expanded.

A further alternative of the sliding shade is shown in FIG. 18. The screen 360 includes a frame member 364 which is generally similar to the frame member 304. The frame member 364 is pivotally mounted to a spring biased rod 366. The rod 366 is an expandable rod and is substantially similar to the rod 202 (FIG. 12). The rod 366 is expanded to the appropriate length to be compressively received, for example, between the back deck D of the vehicle and the ceiling of the vehicle. One end of the screen 368 is secured to the rod 366. As can be appreciated, when the screen is collapsed, as seen in the left side of FIG. 18, the frame member 364 can be pivoted upwardly, such that the screen 368 is substantially received in the channel of the frame member. To expand the screen 368, as seen in the right side of FIG. 18, the frame member 364 is pivoted downwardly, and the screen is advanced towards the free end of the frame member 364, in the same manner as noted above in conjunction with the screen of the shade 300 (FIG. 15).

Figure 22:
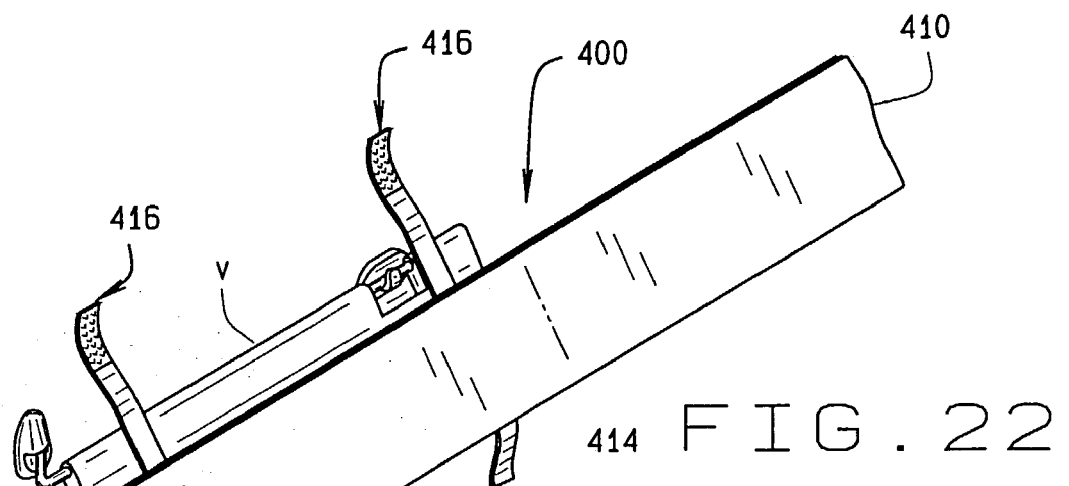
FIG. 22 is a perspective view of the visor-mounted shade when partially unfolded.
Figure 23:
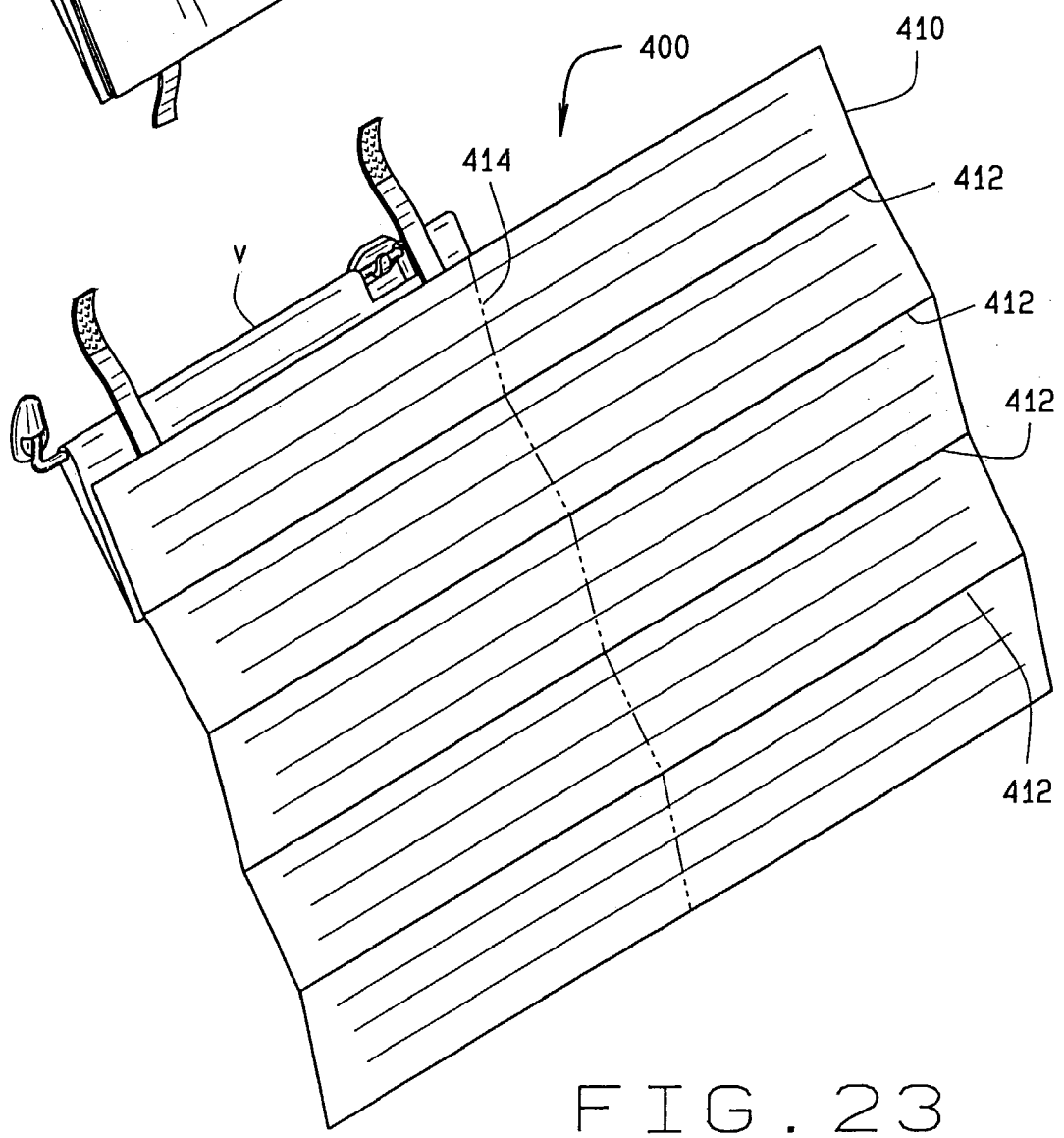
FIG. 23 is a perspective view of the visor-mounted shade when unfolded.
Figure 24:
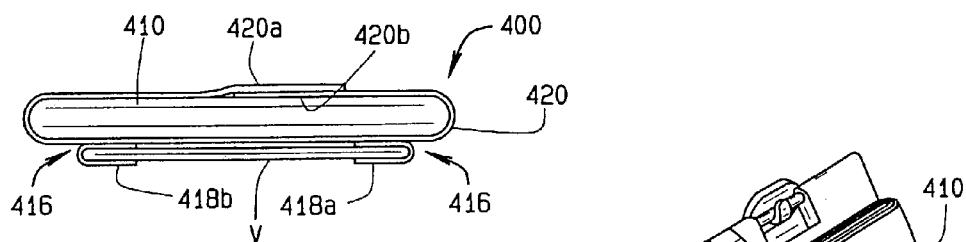
FIG. 24 is a side elevational view of the visor mounted shade mounted to a visor and in the collapsed position.
Figure 25:
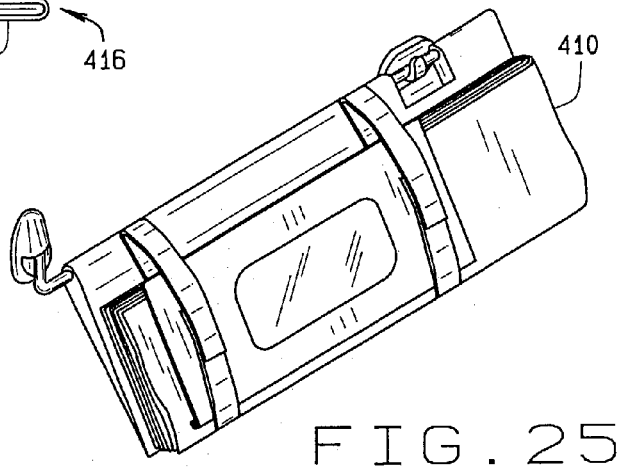
FIG. 25 is a perspective view of an alternative embodiment of the visor mounted shade including a mirror.

A visor-mounted shade 400 is shown in FIGS. 19–24. The shade 400 includes a pleated screen 410. However, rather than being pleated to fold and unfold in a fan-type configuration, the pleats or fold lines 412 are all parallel to each other, to fold up to a rectangular configuration, such as shown in FIG. 22. The folded screen (such as shown in FIG. 22) is then folded in half lengthwise along a fold line 414 to fold up to be the size of a visor V, as seen in FIGS. 19–21. Hence, the shade 100 folds similarly to a map.

A pair of mounting assemblies 416 are used to mount the shade 400 to the visor V. Each mounting assembly 416 includes a pair of opposed clips 418a,b (FIG. 24) which are sized and shaped to grip the visor V. For example, the clips 418a,b can be shaped similarly to the legs of the clips 40' and 40" (FIGS. 6B,C). The clips 418a,b are fixed to an end section of the shade 400 (i.e., between an edge of the shade and a first pleat in the shade) in a spaced apart relationship. The clips 418a,b can be fixed to the shade in any conventional manner. A strap 420 is fixed to each clip 418a,b. The straps include fasteners, such as buttons, snaps, or Velcro hook-and-pile fasteners at their ends 420a,b to connect the ends of the two straps 120 together. The straps are sized to extend around the shade when folded, as seen in FIG. 20, to hold the shade 400 in the closed and folded position.

Alternatively, the clips 418a, b could be replaced with elastic bands to which the shade 400 and the straps 420 are secured. The elastic bands would be sized to stretchingly fit around the visor, similarly to be elastic bands 42 of clip 40 (FIG. 6A). The shade 400 would be secured to a pair of the elastic bands, such as by gluing, sewing, or any other conventional means. Alternatively, instead of an elastic band, the straps 420 and the shade 400 can be fixed to a pair of straps which are sized to wrap around the visor. The opposite ends of this mounting strap would be provided with fasteners, such as buttons, snaps, Velcro, etc, to secure the strap around the visor V, and hence to secure the shade 400 to the visor V.

The shade can be folded about its fold line 414 such that the shade 400, when fully folded, is either fully on one side of the visor V (as seen in FIG. 20), or such that the shade 400 wraps around the visor V, such that one half of the shade is on one side of the visor and the other half of the shade is on the opposite side of the visor.

Figure 26:
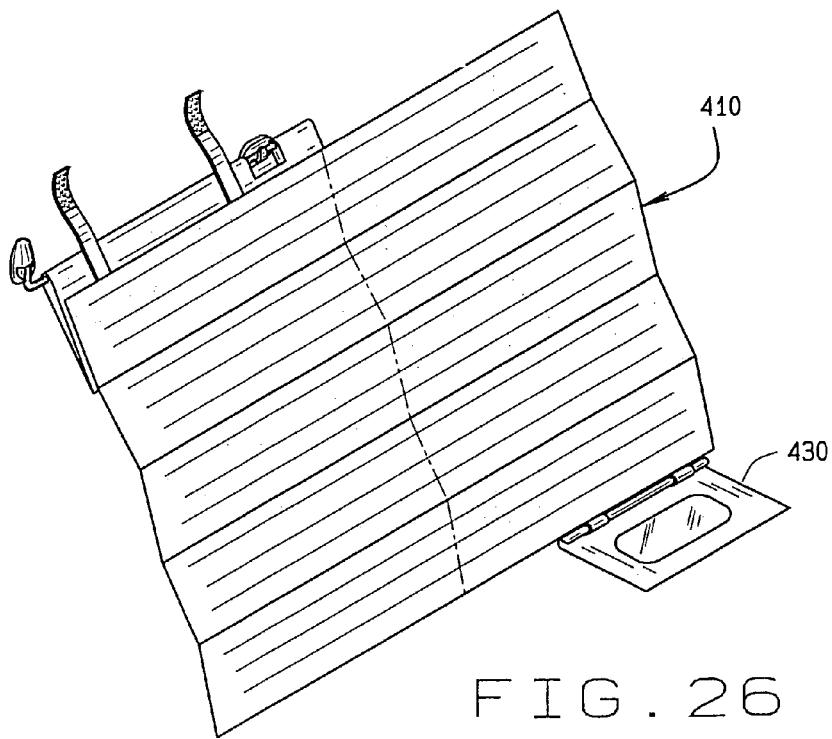
FIG. 26 is a perspective view of the shade of FIG. 25 in an expanded position.

Additionally, the shade 400 can be provided with its own visor 430 which is fixed to a bottom edge of the screen 410, as seen in FIG. 26. The visor 430 is fixed to the screen 410 such that, when the screen is folded, the top edge of the visor 430 will be adjacent and generally parallel to, the bottom edge of the visor V, as seen in FIG. 27. This allows for the visor 430 to be used when the shade 400 is folded up. The visor 430 can be an opaque visor and can be provided with a mirror (as seen in FIG. 27). Alternatively, the visor 430 can be a tinted transparent visor (as seen in FIG. 28), through which the driver can see.

In FIG. 29, the pleats of the screen 410' are closer together than the pleats of the screen 410. This allows for the screen 410' to be folded up to a size which fits above the mirror M of the visor V to which the screen is mounted. In this way, the mirror of the visor will not be blocked.

Figure 30A:
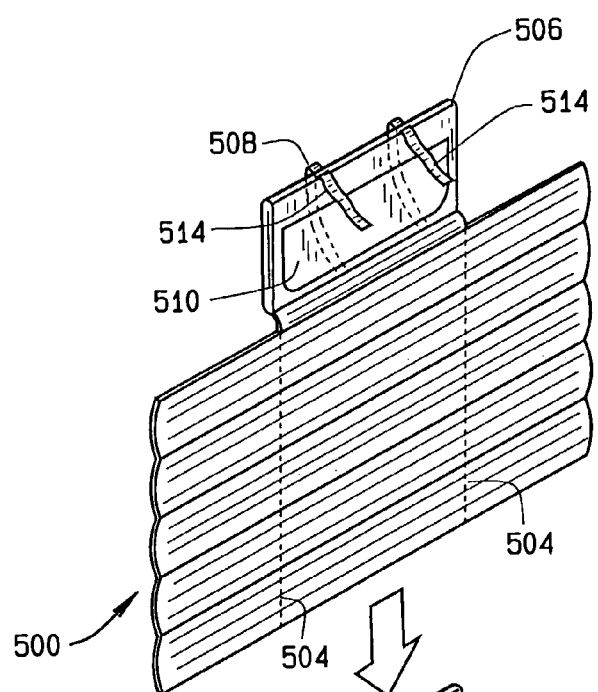
FIGS. 30A–D are perspective views showing a visor mounted shade which includes a storage accessory, the shade screen being shown being moved from its unfolded position to its folded and stored position.
Figure 30B:
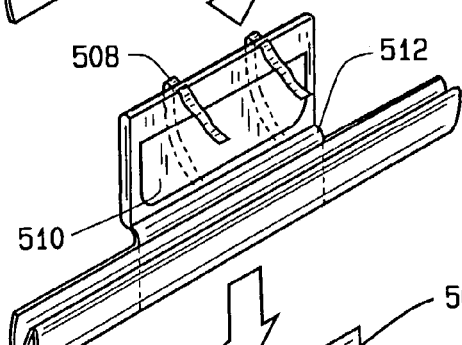
Figure 30C:
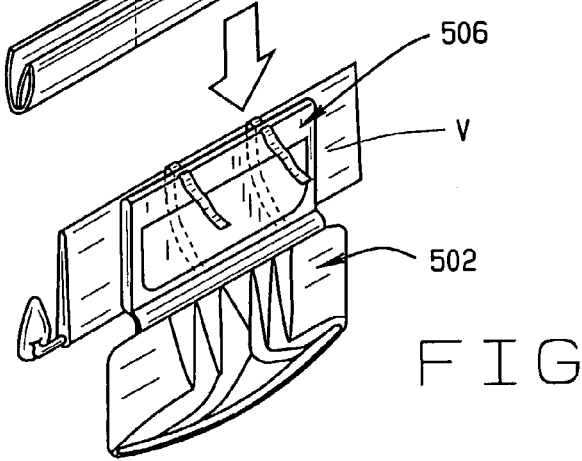
Figure 30D:
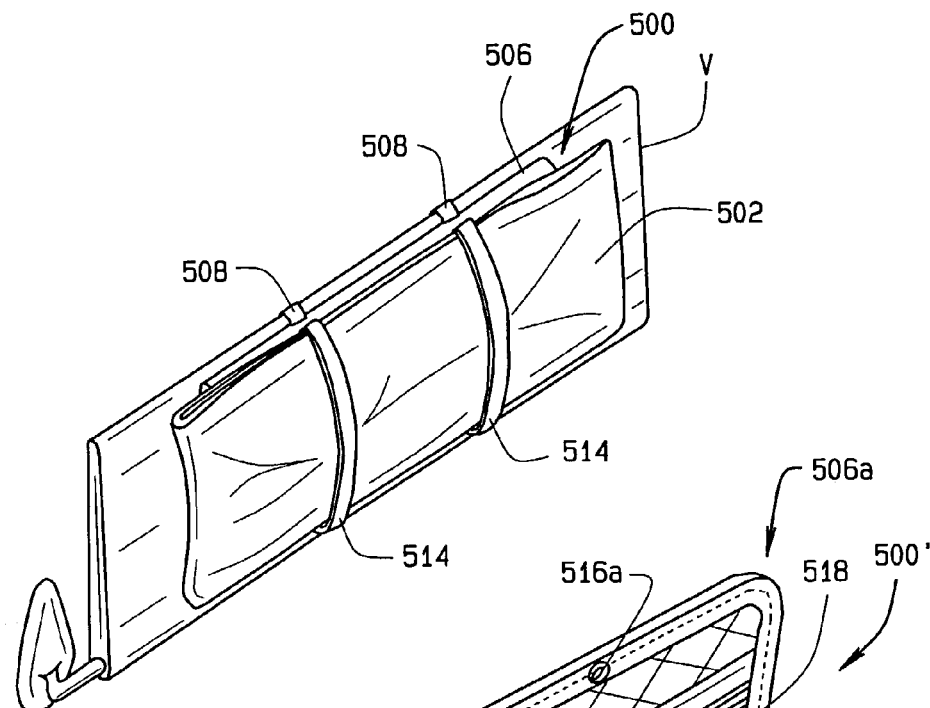

Another visor mountable shade 500 is shown in FIGS. 30A–D. The shade 500 includes a pleated screen 502 which is similar to the screen 410 (FIG. 26). However, rather than including a single vertical fold line, the screen 502 includes a pair of vertical fold lines 504 which allow for the screen to be folded in thirds, as seen in FIGS. 30C–D when the screen is closed to place the screen in a storage position. The shade 500 includes a storage accessory 506 which is mountable to a visor V using, for example, elastic straps 508. Any other means, for example, any of the mounting assemblies noted above, could be used to mount the storage accessory 506 to the visor V. The storage accessory 506 is shown to include a pocket 510 which, for example, could receive items such as parking passes, membership cards, small maps, etc.

The screen 502 is mounted to the bottom edge of the storage accessory 506 using a flexible web 512. The web 512, which forms a living hinge between the bottom of the storage accessory 506 and the top edge of the shade, can be made, for example, from the same material from which the screen 502 is made. The shade additionally includes a pair of closure straps 514, which as shown in FIG. 30D wrap around the screen 502 when closed and folded, to maintain the screen in its folded and stored position. The straps 514 can, for example, include Velcro hook-and-loop strips, and the connecting web 512 can be provided with a corresponding Velcro hook-and-loop strips.

Figure 31A:
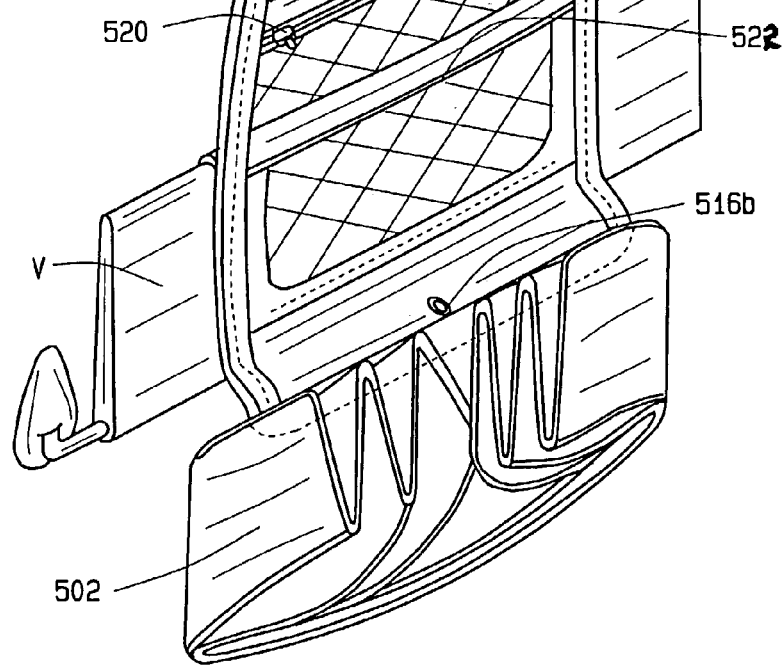
FIGS. 31A–B are perspective views of visor mounted shade including a second a storage accessory; the accessory being shown opened and closed, respectively in the two views.
Figure 31B:
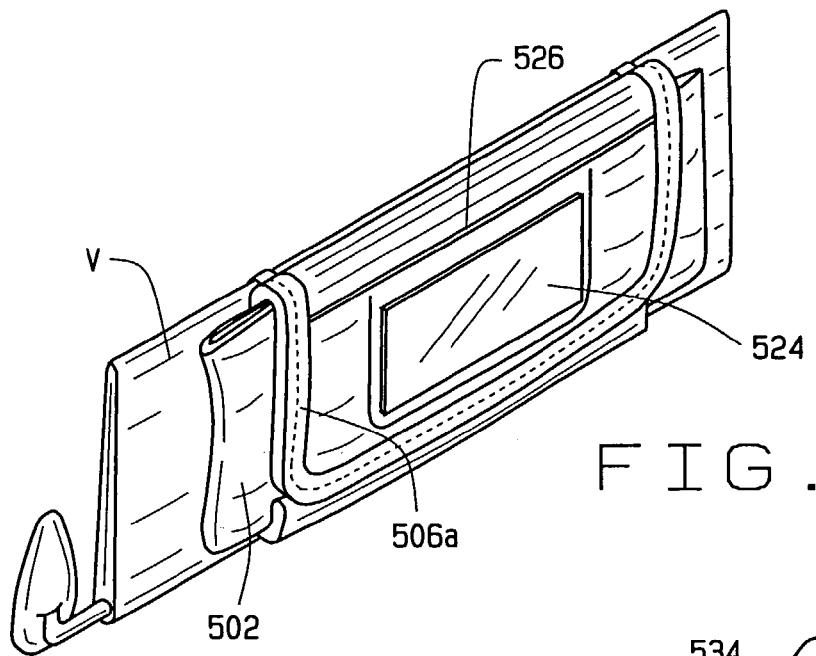

In FIGS. 31A, B shows a shade 500a having second embodiment of the storage accessory. The shade 500a includes the screen 502, but attached to a storage accessory 506a. The storage accessory 506a can be mounted to the visor V in the same manner as the storage accessory 506. The shade 500a is shown with the storage accessory opened in FIG. 28A (and with the screen 502 folded, but not stored) and is shown closed in FIG. 28B (with the screen folded and stored). As seen in FIG. 28A, the storage accessory 506a has a length from top to bottom greater than the height of the visor V, and has a lower portion that extends slightly below the visor V, an upper portion that extends above the visor V, and a midsection or middle portion which extends the height of the visor V. The shade 502 is mounted slightly above the bottom edge of the storage accessory. The bottom edge can be folded up, as seen in FIG. 31B such that the screen 502 is adjacent a midsection of the storage accessory 506a. The top portion of the storage accessory then folds over the screen and the bottom edge The accessory 506a includes a first snap portion 516a along its top edge and a second snap portion 516b at its bottom edge. The two snap sections mate together to hold the accessory closed, as shown in FIG. 31B to maintain the screen 502 in its folded and closed position. The snap sections could be replaced with, for example, Velcro loop-and-pile strips or sections, a button and button hole, or other conventional closure mechanisms.

Returning to FIG. 31A, the storage accessory 506a includes a pocket 518 in the upper section which is closed by a zipper 520. It additionally includes a second pocket 522 in the midsection. As seen in FIG. 31B, a mirror 524 can be provided on the outer section of the upper portion. Additionally, the upper section can be provided with a pocket 526 on its outer surface. Because the pockets 518 and 520 are on inner surfaces, the pocket 526 can be used to store items which will be needed on a more regular basis.

Figure 32A:
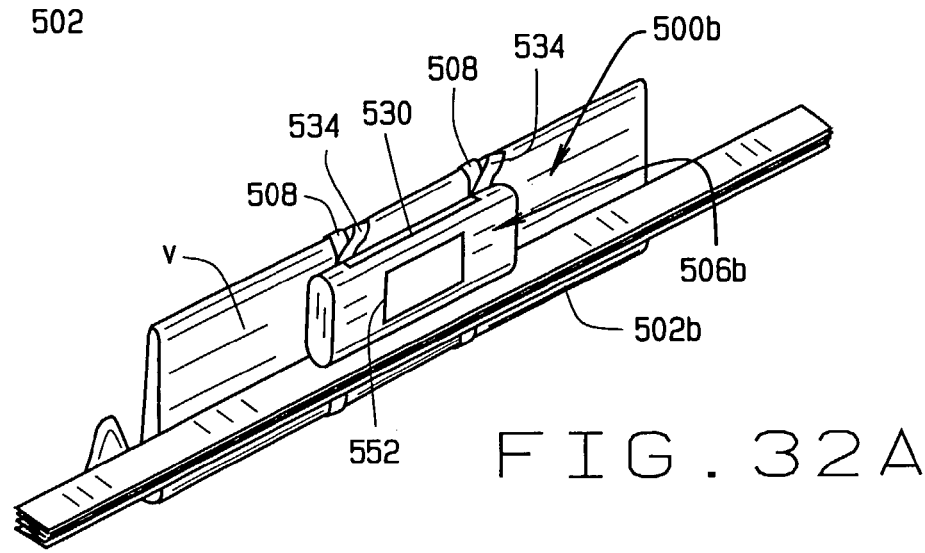
FIGS. 32A–B are perspective views showing a visor mounted shade including a third storage accessory, the shade being shown folded in FIG. 32A and folded and stored in FIG. 32B.
Figure 32B:
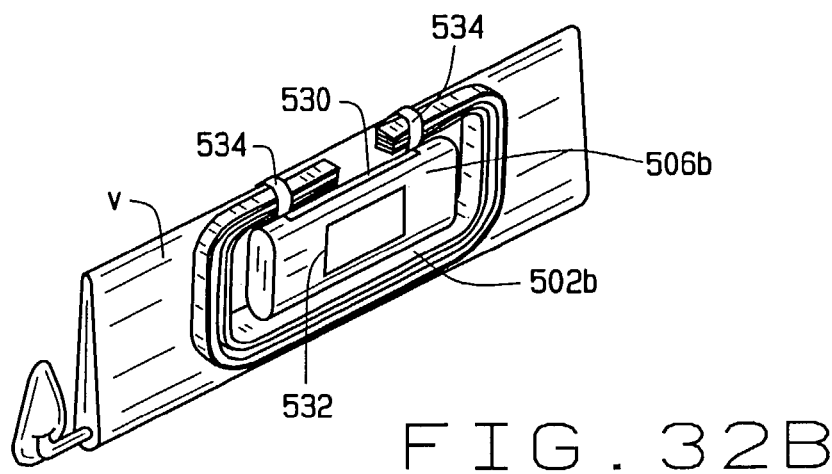

FIGS. 32A and B show a third embodiment of a shade incorporating an storage accessory. The shade 500b includes a storage accessory 506b mountable to a visor V using straps 508 which extend around the visor, as discussed above in conjunction with the shade 500 of FIGS. 30A–D. The storage accessory 506b has front, back, side, top, and bottom walls which define a compartment. The storage accessory has an opening on its top surface which is closed with a zipper 530. The storage accessory is also provided with a mirror 532 on its front wall or surface. The shade 500*b* includes a screen 502*b* which is similar to the screen 410' of FIG. 29 in that it has thinner pleats so that it is thinner in width when folded. Preferably, the pleats of the screen 502*b* are formed so that when it is folded, the screen 502*b* will have a width approximately equal to the front-to-back width of the storage accessory 506*b*. To store the screen 502*b*, the screen 502*b* is folded or wrapped about the storage accessory 506*b*, as seen in FIG. 32B. Although not shown, the screen could be provided with fold lines to facilitate folding or bending of the screen to wrap the screen about the storage accessory. A pair of straps 534 extend from the back wall of the storage accessory 506*b* on opposite sides thereof. Preferably, the straps 534 are parallel to the mounting straps 508. The straps 534 are positioned and sized to extend around the two free ends of the screen 502*b* when the screen is wrapped about the storage accessory. Preferably, the free end of the strap is provided with one portion of a fastener, and a second portion of the fastener is provided on the mounting strap 508, and the two portions of the fastener are connected or mated together to hold the screen 502*b* in its closed position. The fastener can be a Velcro hook-and-loop fastener, snaps, or any other type of conventional fastener, including ties.

Figure 33A:
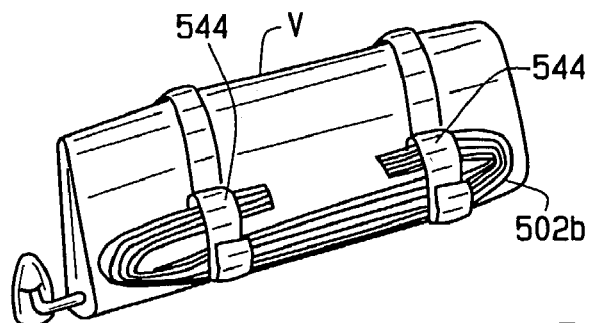
FIGS. 33A–C are perspective views showing the unfolding or unfurling of a visor mounted shade.
Figure 33B:
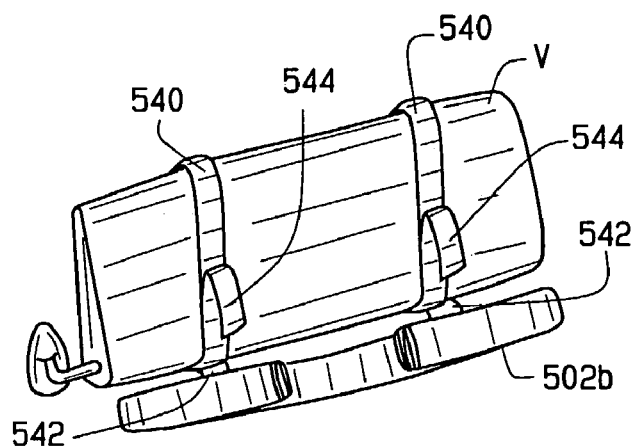
Figure 33C:
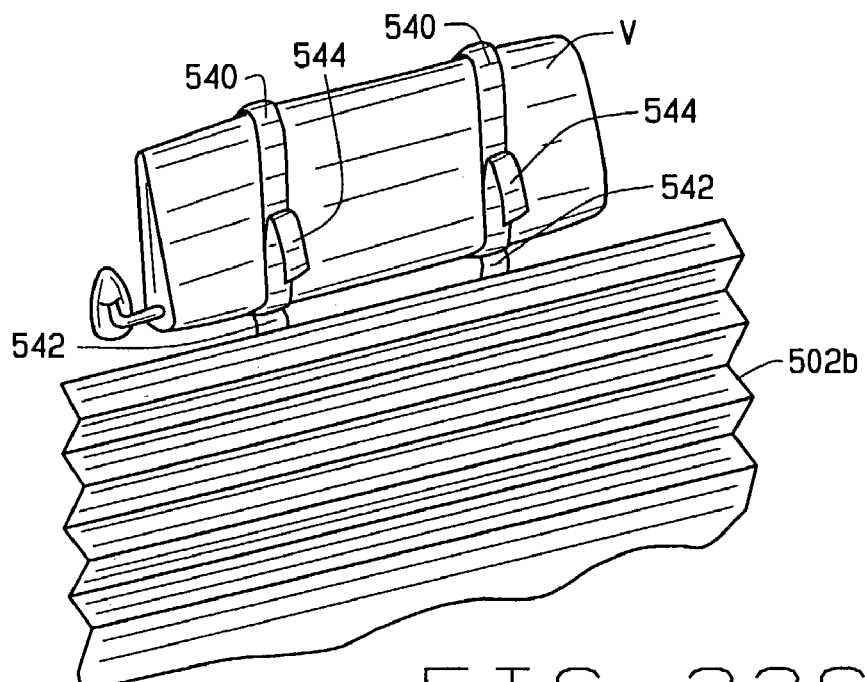

FIGS. 33A–C show the screen 502*b* mounted to the visor V, but without the storage accessory 506*b*. In this instance, the screen 502*b* is mounted to the visor V using straps 540. The straps 540 can be elastic bands that extend around the visor, or can be provided with ends that are connected together by fastening elements, such as hook-and-loop fastening strips, snaps, buckle, etc. The screen 502*b* is connected to the straps 540 by a short section of webbing 542 which is connected at one end to the straps 540 and at an opposite end to the screen 502*b*. There is a webbing section 542 for each strap 540. The straps 540 are mounted or positioned on the visor V such that the webbing sections 542 are at the bottom of the visor V. The screen is movable between an unfolded or unfurled position in which it covers the window, and a folded position for storage. Preferably, the screen 502*b* has a length greater than the visor V, as seen. Thus, to store the screen 502*b* on the visor, the opposite ends of the screen are folded over, as seen in FIG. 33B after the screen has been collapsed (i.e., folded along its pleats). A securing strap 544 is provided on each mounting strap 540 slightly above the webbing 542. The securing straps 544 are sized to extend around the screen 502*b* when it is collapsed and folded over, as seen in FIG. 33A. The straps 544 are provided with a first portion of a fastening element which are matable with a second section of the fastening element when the screen is folded up, from the position shown in FIG. 33B to the position shown in FIG. 33A. The second section of the fastening element can, for example, be positioned on the webbing 544. Alternatively, the webbing 544 can be provided with an extension, and the second section of the fastening element can be positioned on this webbing extension.

Figure 34A:
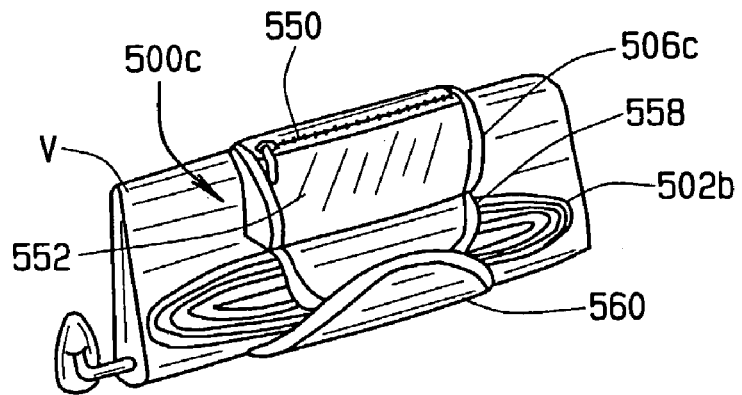
FIGS. 34A–B are perspective views showing a visor mounted shade having a fourth storage accessory; the shade being shown closed and opened in the two views, respectively.
Figure 34B:
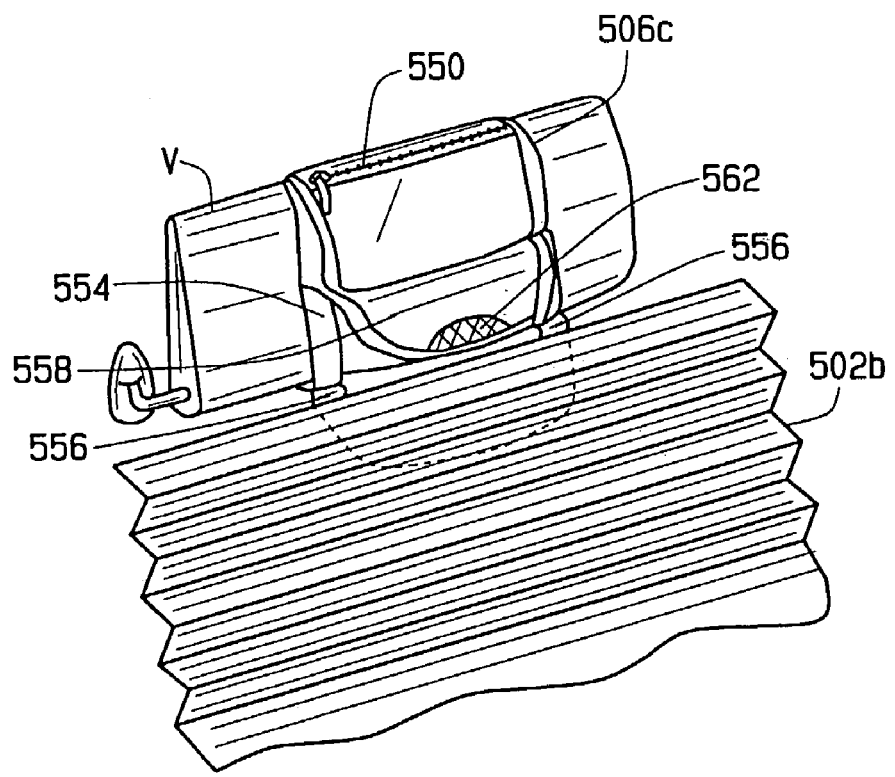

FIG. 34 shows a shade 500*c* which includes a storage accessory 506*c* to which the screen 502*b* is connected. The storage accessory 506*c*, like the storage accessory 502*b*, forms a compartment which has an opening at the top and is closed by zipper 550. The storage accessory 506*c* can also be provided with a mirror 552 on its front surface. The storage accessory 506*c* is mounted to the visor V using straps 554 which extend around the visor V. The straps 554 can be elastic straps which are sized to snuggly wrap around the visor, or can be two straps which are joined at their free ends by a fastening element, such as a snap, hook-and-pile fastener, etc. The straps are sized and positioned such that when the shade 506*c* is mounted to the visor V, the top of the storage accessory is near the top edge of the visor. The shade also includes connecting straps 556 which are connected at one end to the straps 554 and at their opposite ends to the screen 502. The straps 556 are positioned on the straps 554, such that they will be near the bottom edge of the visor V when the shade is mounted on the visor. As seen in FIG. 34B, when the screen 502*b* is unfolded, it hangs from the bottom of the visor. To store the screen in a closed position, it is first folded along its pleats, and then folded over itself, such that the ends of the folded screen do not extend beyond the side edges of the visor V. The shade is then provided with an upper flap 558 which extends from the bottom of the storage accessory 506*c* and a lower flap 560 which extends from the bottom of the connecting straps 556. The upper and lower flaps 558, 560 are sized to wrap around the folded screen and overlap each other, as seen in FIG. 34A. Opposing sections of a fastener 562, such as a snap fastener, hook-and-look fastener, etc. are secured to the free ends of the flaps to hold the flaps together and to hold the screen in its folded and stored position.

As can be appreciated, I have provided several different embodiments of shades, from shades which are mounted in a car window frame to shades mounted to the car's visor. The visor mounted shades can be provided with storage accessories of various sorts, a few variations of which are shown and described in the drawings.

As various changes could be made in the above constructions without departing from the scope of the invention, it is intended that all matter contained in the above description or shown in the accompanying drawings shall be interpreted as illustrative and not in a limiting sense. Various straps are used to hold the screens in their closed position and to mount the shades to visors. Although Velcro hook-and-loop fasteners are preferred for ease of use, any of the straps can be provided with snaps, buttons, buckles, or any other conventional fastening system to hold the screen in its closed and stored position, or to mount the shade to the visor. This example is merely illustrative.

What is claimed is:

1. A foldable automobile shade adapted to be used to prevent sunlight from entering an automobile, the shade comprising:
    a storage accessory comprising at least one of a pocket and a chamber;
    at least one mounting strap connected to said storage accessory; said mounting strap being sized and configured to adapt said storage accessory to be mounted to a visor of an automobile;
    a pleated screen operatively connected to said storage accessory near a bottom of said storage accessory; said pleated screen having a plurality of parallel pleats, said screen being selectively movable between an unfolded position in which said screen can cover at least a portion of a vehicle window and a folded position; said screen, when folded, having a height adapted to be less than the height of a visor of the automobile; and
    a closure which maintains said screen in a stored position.

2. The foldable automobile shade of claim 1 wherein said screen is connected to said storage accessory by a web of flexible material.

3. The foldable automobile shade of claim 2 wherein said web of flexible material extends substantially the side-to-side width of said storage accessory.

4. The foldable automobile shade of claim 2 wherein said web defines at least one connecting strap which extends between said storage accessory and said screen; said connecting strap having a width substantially less than the side-to-side width of said storage accessory.

5. The foldable automobile shade of claim 1 wherein said storage accessory includes a closure operable to close said pocket or compartment.

6. The foldable automobile shade of claim 1 wherein said screen has a length adapted to be longer than a visor of an automobile; and wherein, said screen is adapted to be folded at least at two locations spaced from ends of said screen when said screen is collapsed along its pleats, such that, said screen in its folded position is adapted to fit within the borders of the visor.

7. The foldable automobile shade of claim 6 wherein said screen, when in its folded and stored position, is wrapped about said storage compartment.

8. The foldable automobile shade of claim 7 wherein said closure comprises at least one strap extending from a top edge of said accessory and which have a length sized to extend around opposite ends of said folded screen; said straps including fasteners at the ends thereof to secure said screen in its storage position.

9. The foldable automobile shade of claim 8 wherein said closure straps are parallel to said mounting straps; said fastener including a second fastener section on said mounting strap which interacts with said fastener on said closure strap to hold said screen in its folded and stored position.

10. The foldable automobile shade of claim 6, wherein said screen is folded over to place said screen in its folded and stored position.

11. The foldable automobile shade of claim 10 wherein said closure comprises at least one strap which extends from one of a top or bottom edge of said storage accessory, has a length sufficient to extend over said screen when folded, and which is adapted to be operatively connected to the other of said top and bottom edges of said storage accessory to maintain said screen in its folded and stored position.

12. The foldable automobile shade of claim 10 wherein said closure comprises a first flap and a second flap; said first and second flaps having a combined length sufficient to extend around said screen when folded to its stored position and to overlap each other; said first and second flap including mating fastening elements which interact to maintain said screen in its folded and stored position.

13. The foldable automobile shade of claim 12 wherein said first flap extends from a bottom of said storage accessory and said second flap is mounted to said mounting straps spaced below said first flap.

14. The foldable automobile shade of claim 12 wherein said first and second flaps are integrally formed with said storage accessory; said first flap defining an upper portion of said storage accessory and said second flap defining a lower portion of said storage accessory.

15. The foldable automobile shade of claim 12 wherein said pocket is formed on at least one of a midsection of said storage accessory, an inner surface of said storage accessory upper portion, and on an outer surface of said storage accessory upper portion.

* * * * *